(12) United States Patent
Zhang et al.

(10) Patent No.: US 11,929,804 B1
(45) Date of Patent: Mar. 12, 2024

(54) TECHNIQUES FOR CODEWORD-BASED RADIAL BEAMFORMING FOR ORBITAL ANGULAR MOMENTUM WAVEFORMS

(71) Applicant: QUALCOMM Incorporated, San Diego, CA (US)

(72) Inventors: Danlu Zhang, San Diego, CA (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/969,578

(22) Filed: Oct. 19, 2022

(51) Int. Cl.
*H04B 7/06* (2006.01)
(52) U.S. Cl.
CPC .......... *H04B 7/0617* (2013.01); *H04B 7/063* (2013.01)
(58) Field of Classification Search
CPC ............................. H04B 7/0617; H04B 7/063
USPC ....................................................... 375/267
See application file for complete search history.

(56) References Cited

U.S. PATENT DOCUMENTS

2018/0167144 A1* 6/2018 Howlader ............ H04B 10/524
2022/0078780 A1* 3/2022 Choi ..................... H04B 7/0456

* cited by examiner

*Primary Examiner* — Fitwi Y Hailegiorgis
(74) *Attorney, Agent, or Firm* — Holland & Hart LLP

(57) ABSTRACT

Methods, systems, and devices for wireless communications are described. A first wireless device may be configured to transmit, to a second wireless device, one or more orbital angular momentum (OAM) signals in accordance with a set of radial codeword sequences associated with a polynomial radial codeword configuration, where the one or more OAM signals are transmitted based on a first value of a polynomial term for the polynomial radial codeword configuration. The first wireless device may receive, from the second wireless device on the one or more OAM signals, a feedback message indicating a second value of the polynomial term. The first wireless device may then transmit, to the second wireless device, one or more additional OAM signals in accordance with the set of radial codeword sequences and based on the second value for the polynomial term.

30 Claims, 14 Drawing Sheets

TECHNIQUES FOR CODEWORD-BASED RADIAL BEAMFORMING FOR ORBITAL ANGULAR MOMENTUM WAVEFORMS

FIELD OF TECHNOLOGY

The following relates to wireless communications, including techniques for codeword-based radial beamforming for orbital angular momentum (OAM) waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications devices may be able to perform orbital angular momentum (OAM) communications. OAM communications may be transmitted and received using uniform circular array (UCA) antenna panels, and may exhibit a helical-shaped waveform, where the OAM communications propagate coaxially through space.

SUMMARY

The described techniques relate to improved methods, systems, devices, and apparatuses that support techniques for codeword-based radial beamforming for orbital angular momentum (OAM) waveforms. Generally, aspects of the present disclosure are directed to techniques for identifying radial codeword sequences for OAM communications. In particular, aspects of the present disclosure may support techniques for limiting candidate radial codeword sequences to polynomial-based configurations or formats in order to simplify feedback mechanisms that enable transmitter (Tx) and receiver (Rx) devices to determine radial codeword sequences that will be used between the respective devices. Types of polynomial radial codeword configurations may include Laguerre polynomials, Slepian polynomials, and the like. Polynomial radial codewords may refer to different sets or sequences of weights that are applied in the radial direction to generate OAM communications. By limiting radial codeword sequences to known/defined polynomial configurations, techniques described herein may simplify the type and size of feedback exchanged between devices to determine radial codeword sequences for OAM communications.

A method for wireless communication at a first wireless device is described. The method may include transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration, receiving, from the second wireless device based on the one or more OAM signals, a feedback message indicating a second value of the polynomial term, and transmitting, to the second wireless device, one or more additional OAM signals in accordance with the set of radial codeword sequences and based on the second value.

An apparatus for wireless communication at a first wireless device is described. The apparatus may include a processor, memory coupled with the processor, and instructions stored in the memory. The instructions may be executable by the processor to cause the apparatus to transmit, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration, receive, from the second wireless device based on the one or more OAM signals, a feedback message indicating a second value of the polynomial term, and transmit, to the second wireless device, one or more additional OAM signals in accordance with the set of radial codeword sequences and based on the second value.

Another apparatus for wireless communication at a first wireless device is described. The apparatus may include means for transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration, means for receiving, from the second wireless device based on the one or more OAM signals, a feedback message indicating a second value of the polynomial term, and means for transmitting, to the second wireless device, one or more additional OAM signals in accordance with the set of radial codeword sequences and based on the second value.

A non-transitory computer-readable medium storing code for wireless communication at a first wireless device is described. The code may include instructions executable by a processor to transmit, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration, receive, from the second wireless device based on the one or more OAM signals, a feedback message indicating a second value of the polynomial term, and transmit, to the second wireless device, one or more additional OAM signals in accordance with the set of radial codeword sequences and based on the second value.

In some examples of the method, apparatuses, and non-transitory computer-readable medium described herein, each radial codeword sequence of the set of radial codeword sequences may be configured to apply a set of weights to the one or more OAM signals along a radial direction of an antenna array at the second wireless device.

Some examples of the method, apparatuses, and non-transitory computer-readable medium described herein may further include operations, features, means, or instructions for receiving, via the feedback message, a ratio between the first value and the second value of the polynomial term, where transmitting the one or more additional OAM signals may be based on the ratio.

Some examples of the method, apparatuses, and non-transitory computer-readable medium described herein may further include operations, features, means, or instructions for receiving, via the feedback message, an indication of a subset of radial codeword sequences from the set of radial codeword sequences, where the one or more additional OAM signals may be transmitted in accordance with the subset of radial codeword sequences.

Some examples of the method, apparatuses, and non-transitory computer-readable medium described herein may further include operations, features, means, or instructions for receiving, via the feedback message, a power allocation associated with at least a subset of the set of radial codeword sequences, where the one or more additional OAM signals may be transmitted based on the power allocation.

Some examples of the method, apparatuses, and non-transitory computer-readable medium described herein may further include operations, features, means, or instructions for communicating, with the second wireless device, a message indicating the polynomial radial codeword configuration, where transmitting the one or more OAM signals, receiving the feedback message, or both, may be based on the message.

Some examples of the method, apparatuses, and non-transitory computer-readable medium described herein may further include operations, features, means, or instructions for determining a distance between the first wireless device and the second wireless device, where the first value of the polynomial term may be based on the distance.

In some examples of the method, apparatuses, and non-transitory computer-readable medium described herein, the first value, the second value, or both, may be based on a set of parameters associated with a first antenna panel at the first wireless device, a second antenna panel at the second wireless device, or both.

In some examples of the method, apparatuses, and non-transitory computer-readable medium described herein, the set of parameters include a first quantity of antenna elements associated with the first antenna panel, a second quantity of antenna elements associated with the second antenna panel, a first radius associated with a first set of multiple antenna elements of the first antenna panel, a second radius associated with a second set of multiple antenna elements of the second antenna panel, or any combination thereof.

Some examples of the method, apparatuses, and non-transitory computer-readable medium described herein may further include operations, features, means, or instructions for receiving, from the second wireless device based on the one or more additional OAM signals, a second feedback message indicating a third value of the polynomial term and transmitting, to the second wireless device, a third set of OAM signals in accordance with the set of radial codeword sequences and based on the third value.

Some examples of the method, apparatuses, and non-transitory computer-readable medium described herein may further include operations, features, means, or instructions for determining that a difference between the first value and the second value may be less than a threshold and transmitting the one or more additional OAM signals based on the second value throughout a time interval based on determining that the difference satisfies the threshold.

In some examples of the method, apparatuses, and non-transitory computer-readable medium described herein, the polynomial radial codeword configuration includes a Laguerre polynomial configuration or a Slepian polynomial configuration.

In some examples of the method, apparatuses, and non-transitory computer-readable medium described herein, the polynomial radial codeword configuration includes a polynomial configuration which maximizes a signal energy received at the second wireless device, the signal energy associated with the one or more OAM signals, the one or more additional OAM signals, or both.

In some examples of the method, apparatuses, and non-transitory computer-readable medium described herein, the polynomial term may be associated with a beam width value associated with OAM signals transmitted by the first wireless device.

In some examples of the method, apparatuses, and non-transitory computer-readable medium described herein, the polynomial term may be associated with a first radius of a first antenna array at the first wireless device, a second radius of a second antenna array at the second wireless device, a wavelength of the one or more OAM signals, a distance between the first wireless device and the second wireless device, or any combination thereof.

A method for wireless communication at a second wireless device is described. The method may include receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration, transmitting, to the first wireless device based on the one or more OAM signals, a feedback message indicating a second value of the polynomial term, and receiving, from the first wireless device, one or more additional OAM signals in accordance with the set of radial codeword sequences and based on the second value.

An apparatus for wireless communication at a second wireless device is described. The apparatus may include a processor, memory coupled with the processor, and instructions stored in the memory. The instructions may be executable by the processor to cause the apparatus to receive, from a first wireless device, one or more OAM signals in accordance with a set of radial codeword sequences associated with a polynomial radial codeword configuration, the one or more OAM signals are associated with a first value of a polynomial term for the polynomial radial codeword configuration, transmit, to the first wireless device based on the one or more OAM signals, a feedback message indicating a second value of the polynomial term, and receive, from the first wireless device, one or more additional OAM signals in accordance with the set of radial codeword sequences and based on the second value.

Another apparatus for wireless communication at a second wireless device is described. The apparatus may include means for receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration, means for transmitting, to the first wireless device based on the one or more OAM signals, a feedback message indicating a second value of the polynomial term, and means for receiving, from the first wireless device, one or more additional OAM signals in accordance with the set of radial codeword sequences and based on the second value.

A non-transitory computer-readable medium storing code for wireless communication at a second wireless device is described. The code may include instructions executable by a processor to receive, from a first wireless device, one or more OAM signals in accordance with a set of radial codeword sequences associated with a polynomial radial codeword configuration, the one or more OAM signals are associated with a first value of a polynomial term for the polynomial radial codeword configuration, transmit, to the first wireless device based on the one or more OAM signals, a feedback message indicating a second value of the polynomial term, and receive, from the first wireless device, one or more additional OAM signals in accordance with the set of radial codeword sequences and based on the second value.

Some examples of the method, apparatuses, and non-transitory computer-readable medium described herein may further include operations, features, means, or instructions for performing measurements on the one or more OAM signals and determining the second value of the polynomial term based on the measurements, where transmitting the feedback message may be based on determining the second value.

Some examples of the method, apparatuses, and non-transitory computer-readable medium described herein may further include operations, features, means, or instructions for transmitting, via the feedback message, a ratio between the first value and the second value of the polynomial term, where receiving the one or more additional OAM signals may be based on the ratio.

Some examples of the method, apparatuses, and non-transitory computer-readable medium described herein may further include operations, features, means, or instructions for transmitting, via the feedback message, an indication of a subset of radial codeword sequences from the set of radial codeword sequences, where the one or more additional OAM signals may be received in accordance with the subset of radial codeword sequences.

Some examples of the method, apparatuses, and non-transitory computer-readable medium described herein may further include operations, features, means, or instructions for transmitting, via the feedback message, a power allocation associated with at least a subset of the set of radial codeword sequences, where the one or more additional OAM signals may be received based on the power allocation.

Some examples of the method, apparatuses, and non-transitory computer-readable medium described herein may further include operations, features, means, or instructions for communicating, with the second wireless device, a message indicating the polynomial radial codeword configuration, where receiving the one or more OAM signals, transmitting the feedback message, or both, may be based on the message.

In some examples of the method, apparatuses, and non-transitory computer-readable medium described herein, the first value of the polynomial term may be based on a distance.

In some examples of the method, apparatuses, and non-transitory computer-readable medium described herein, the first value, the second value, or both, may be based on a set of parameters associated with a first antenna panel at the first wireless device, a second antenna panel at the second wireless device, or both.

In some examples of the method, apparatuses, and non-transitory computer-readable medium described herein, the set of parameters include a first quantity of antenna elements associated with the first antenna panel, a second quantity of antenna elements associated with the second antenna panel, a first radius associated with a first set of multiple antenna elements of the first antenna panel, a second radius associated with a second set of multiple antenna elements of the second antenna panel, or any combination thereof.

Some examples of the method, apparatuses, and non-transitory computer-readable medium described herein may further include operations, features, means, or instructions for transmitting, to the first wireless device based on the one or more additional OAM signals, a second feedback message indicating a third value of the polynomial term and receiving, from the first wireless device, a third set of OAM signals in accordance with the set of radial codeword sequences and based on the third value.

Some examples of the method, apparatuses, and non-transitory computer-readable medium described herein may further include operations, features, means, or instructions for receiving the one or more additional OAM signals based on the second value throughout a time interval based on a difference between the first value and the second value satisfying a threshold.

In some examples of the method, apparatuses, and non-transitory computer-readable medium described herein, the polynomial radial codeword configuration includes a Laguerre polynomial configuration or a Slepian polynomial configuration.

In some examples of the method, apparatuses, and non-transitory computer-readable medium described herein, the polynomial term may be associated with a beam width value associated with OAM signals transmitted by the first wireless device.

DETAILED DESCRIPTION

Figure 1:
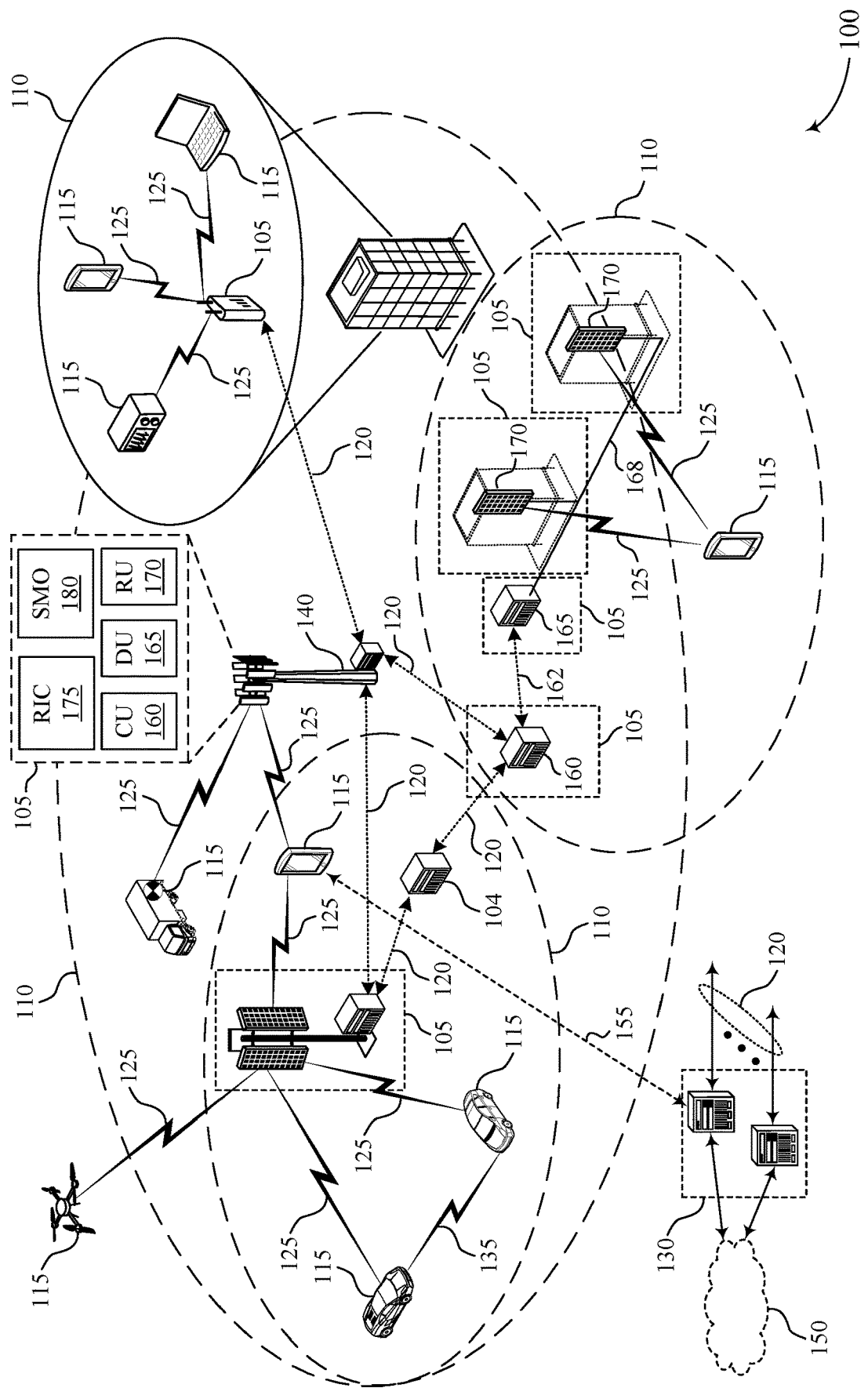
FIG. 1 illustrates an example of a wireless communications system that supports techniques for codeword-based radial beamforming for orbital angular momentum (OAM) waveforms in accordance with one or more aspects of the present disclosure.

Some wireless communications devices may be able to perform orbital angular momentum (OAM) communications. OAM communications may be transmitted and received using uniform circular array (UCA) antenna panels, and may exhibit a helical-shaped waveform, where the OAM communications propagate coaxially through space. Wireless devices may be configured to generate (and decode) OAM communications according to respective radial codeword sequences or modes, where the radial codeword sequences/modes determine the characteristics of the OAM waveform. For example, a radial codeword sequence may be associated with a set of OAM-formed weights that are applied to the respective Tx antenna elements of a UCA to generate the OAM waveform. Tx and Rx devices may negotiate or indicate radial codeword sequence that are used for OAM communications to improve the quality and performance of the OAM communications.

In some cases, there may potentially be infinite quantities of candidate radial codeword configurations or formats that may be used to form OAM waveforms. However, such large quantities of candidate radial codeword configurations may complicate the ability of Rx devices to provide feedback to adjust radial codeword sequences (as well as increase the size/complexity of feedback for adjusting radial codeword sequences). In other words, numerous candidate radial codeword formats may also result in numerous types of information that the Rx device may feed back to the Tx device to adjust the radial codeword sequences, thereby resulting in increased processing complexity for determining radial codeword sequences for OAM transmissions.

Accordingly, aspects of the present disclosure are directed to techniques for identifying radial codeword sequences for OAM communications. In particular, aspects of the present disclosure are directed to techniques for limiting candidate radial codeword sequences to polynomial-based configurations or formats in order to simplify feedback mechanisms that enable Tx and Rx devices to determine radial codeword sequences that will be used between the respective devices. Types of polynomial radial codeword configurations may include Laguerre polynomials, Slepian polynomials, and the like. By limiting radial codeword sequences to known/defined polynomial configurations, techniques described herein may simplify the type and size of feedback exchanged between devices to determine radial codeword sequences for OAM communications.

For example, a Tx device may select an initial value of a polynomial term for a polynomial radial codeword configuration (e.g., Laguerre polynomial, Slepian polynomial), and may transmit OAM signals using a radial codeword sequence based on the initial value. For instance, in the context of a Laguerre polynomial, the Tx device may select an initial value of a beam width term of the Laguerre polynomial. In this example, an Rx device may calculate a new value for the polynomial term, and may transmit a feedback message indicating the new value (or a ratio between the new value and the initial value). Subsequently, the Tx device may perform OAM communications based on the new value. In this regard, the Tx and the Rx device may perform an iterative feedback loop to determine an optimal value for the term of the polynomial radial codeword configuration (e.g., optimal beam width term for the Laguerre polynomial).

Aspects of the disclosure are initially described in the context of wireless communications systems. Additional aspects of the disclosure are described in the context of an example OAM communications configuration and an example process flow. Aspects of the disclosure are further illustrated by and described with reference to apparatus diagrams, system diagrams, and flowcharts that relate to techniques for codeword-based radial beamforming for OAM waveforms.

FIG. 1 illustrates an example of a wireless communications system 100 that supports techniques for codeword-based radial beamforming for OAM waveforms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for codeword-based radial beamforming for OAM waveforms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword sequence) or different data streams (e.g., different codeword sequences). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, wireless devices (e.g., UEs 115, network entities 105, IAB nodes, etc.) of the wireless communications system 100 may support techniques for identifying codeword sequences (e.g., radial codeword sequences) for OAM communications. In particular, the respective devices (e.g., network entities 105, UEs 115, IAB nodes, etc.) of the wireless communications system may support signaling and other configurations for limiting candidate radial codeword sequences to polynomial-based configurations or formats in order to simplify feedback mechanisms that enable Tx and Rx devices to determine radial codeword sequences that will be used between the respective devices. Types of polynomial codeword configurations may include Laguerre polynomials, Slepian polynomials, and the like.

For example, a Tx device of the wireless communications system 100 (e.g., network entity 105) may select an initial value of a polynomial term for a polynomial codeword configuration (e.g., Laguerre polynomial, Slepian polynomial), and may transmit OAM signals using a codeword sequence (e.g., radial codeword sequence) based on the initial value to an Rx device (e.g., UE 115). For instance, in the context of a Laguerre polynomial, the Tx device may select an initial value of a beam width term of the Laguerre polynomial. In this example, an Rx device may calculate a new value for the polynomial term, and may transmit a feedback message indicating the new value (or a ratio between the new value and the initial value). Subsequently, the Tx device may perform OAM communications based on the new value. In this regard, the Tx and the Rx device may perform an iterative feedback loop to determine an optimal value for the term of the polynomial codeword configuration (e.g., optimal beam width term for the Laguerre polynomial).

Techniques described herein may enable wireless devices to negotiate codewords that are used to perform OAM communications. In particular, techniques described herein may enable Tx and Rx devices to negotiate or indicate polynomial codeword configurations that are to be used for OAM communications between the respective devices, and exchange signaling used to determine values for polynomial terms associated with the indicated/negotiated polynomial codeword configuration. By limiting radial codeword sequences to known/defined polynomial codeword configurations, techniques described herein may simplify the type and size of feedback exchanged between devices to determine radial codeword sequences for OAM communications. As such, techniques described herein may reduce a size and or frequency of feedback messages exchanged between devices used to determine codewords for OAM communications, thereby improving resource utilization, and decreasing power consumption at the respective devices.

Figure 2:
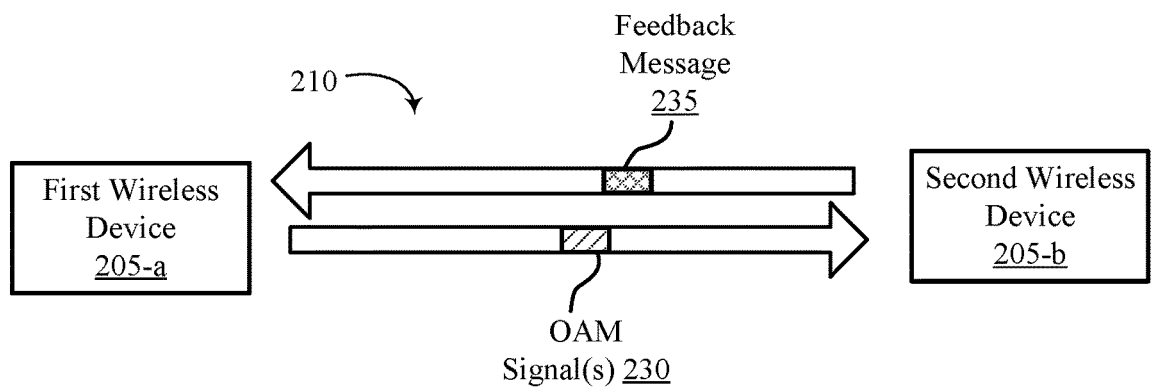
FIG. 2 illustrates an example of a wireless communications system that supports techniques for codeword-based radial beamforming for OAM waveforms in accordance with one or more aspects of the present disclosure.
Figure 2:
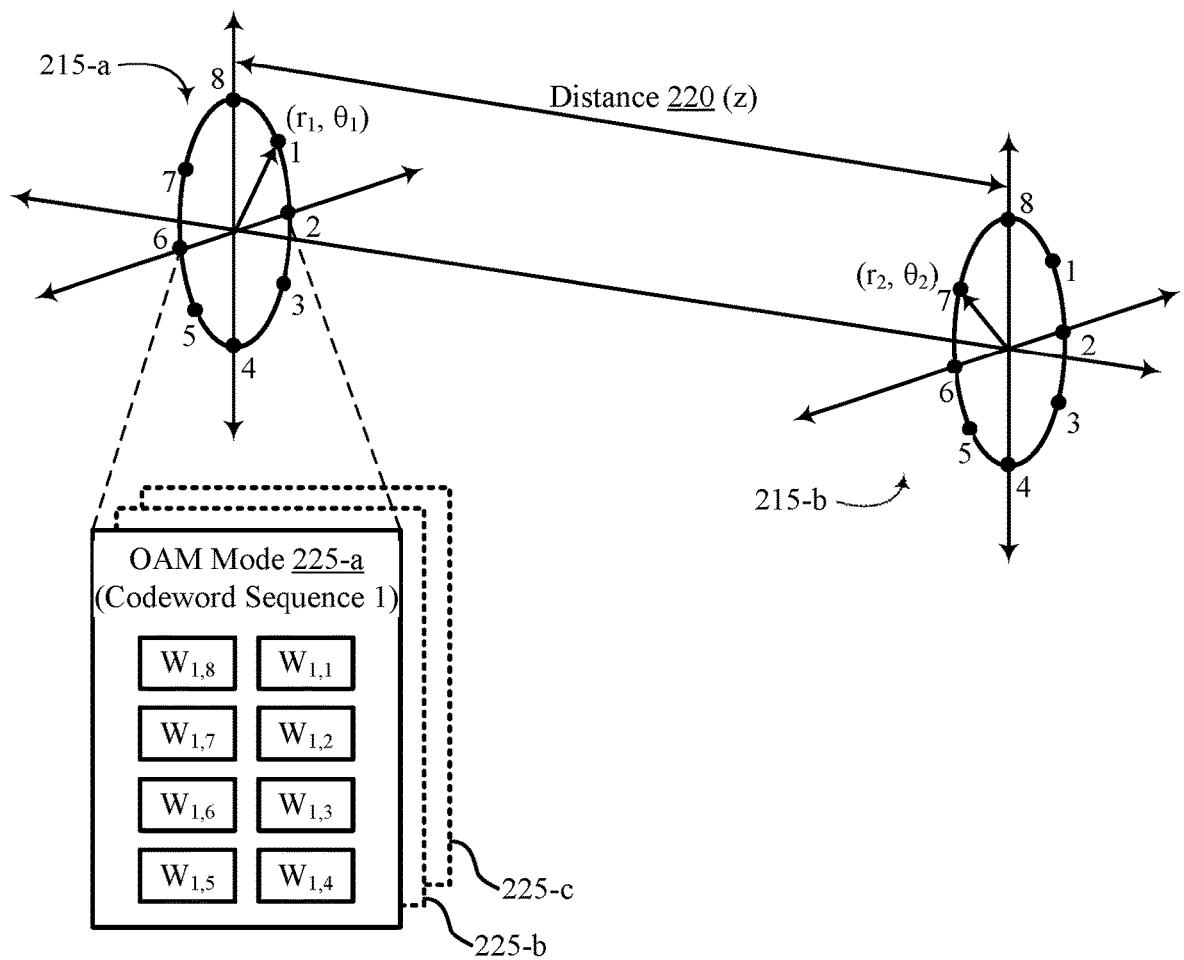

FIG. 2 illustrates an example of a wireless communications system 200 that supports techniques for codeword-based radial beamforming for OAM waveforms in accordance with one or more aspects of the present disclosure. In some examples, aspects of the wireless communications system 200 may implement, or be implemented by, aspects of the wireless communications system 100. In particular, the wireless communications system 200 may support techniques for determining radial codewords for OAM communications, as described previously herein.

The wireless communications system 200 includes a first wireless device 205-*a* and a second wireless device 205-*b*, which may be examples of wireless devices as described herein. For example, in some cases, the first wireless device 205-*a* may include a network entity 105, and the second wireless device 205-*b* may include a UE 115. By way of another example, both wireless devices 205-*a*, 205-*b* may include UEs 115, IAB nodes, etc.

In some aspects, the first wireless device 205-*a* and the second wireless device 205-*b* may communicate with one another using a communication link 210, which may be an example of an NR or LTE link, a sidelink (e.g., PC5 link), and the like, between the respective devices. In some cases, the communication link 210 may include an example of an access link (e.g., Uu link) which may include a bi-directional link that enables both uplink and downlink communication. For example, the second wireless device 205-*b* may transmit uplink signals, such as uplink control signals or uplink data signals, to one or more components of the first wireless device 205-*a* using the communication link 210, and one or more components of the first wireless device 205-*a* may transmit downlink signals, such as downlink control signals or downlink data signals, to the second wireless device 205-*b* using the communication link 210.

The first wireless device 205-*a* and the second wireless device 205-*b* may communicate with one another using a first antenna array 215-*a* and a second antenna array 215-*b*, respectively. Each of the respective antenna arrays 215 may include a set of antenna elements which may be used to transmit and/or receive communications. For example, as shown in FIG. 2, the antenna arrays 215 may include a UCA antenna arrays with eight antenna elements each. In additional or alternative implementations, the antenna arrays 215 may include different quantities of antenna elements.

As noted previously herein, some wireless communications devices may be able to perform OAM communications. OAM communications may be transmitted and received using UCA antenna panels, such as the antenna arrays 215-a, 215-b illustrated in FIG. 2. OAM communications may exhibit a helical-shaped waveform, where the OAM communications propagate coaxially through space. OAM communications may enable MIMO transmissions in a line-of-sight (LoS) channel, where the multiple modes for OAM MIMO communications may be obtained in both the azimuth and radial directions, as will be further shown and described with reference to FIG. 3. While there has been some amount of study on OAM modes in the azimuth direction, there has been little study on OAM modes in the radial direction. As such, some aspects of the present disclosure are directed to techniques for determining beamforming codewords (e.g., radial codeword sequences) for OAM communications in the radial direction (e.g., radial modes).

Current and future radio access technologies, such as Sixth Generation (6G) communication technology, may aim to increase data rates as compared to prior radio access technologies. In some cases, radio access technologies may attempt to increase data rates using communications based on OAM multiplexing due to the capability of OAM communications to provide high-order spatial multiplexing. In the context of OAM communications, a Tx device may radiate multiple coaxially propagating, spatially-overlapping waves (e.g., OAM mode l= . . . ,−2,−1,0,1,2, . . . ), where each coaxially propagating wave each carries a data stream through a pair of apertures.

In some aspects, an electromagnetic wave with a helical transverse phase of the form exp(iφl) may carry an OAM mode waveform, where φ is the azimuthal angle and l is an unbounded integer (which may be referred to as OAM order). Traditional electromagnetic beams (such as Gaussian beams) may include examples of OAM beams with l=0. In theory, these waves can be orthogonally received at the same radio or Rx device (time-frequency domains). As such, using OAM multiplexing can greatly improve communication spectrum efficiency with low Rx processing complexity. Moreover, polarization may be added to each OAM mode to double the number of orthogonal streams.

One implementation of OAM-based communications may be performed by a set of UCA transmitter antennas and a set of UCA receiver antennas, such as the UCA antenna arrays 215-a and 215-b illustrated in FIG. 2. For instance, the first antenna array 215-a illustrated in FIG. 2 is an example of a UCA in which the Tx antenna elements (numbered 1 through 8) are evenly distributed around the antenna array 215-a in a circle. In some aspects, by multiplying respective OAM-formed weights $w_1=[w_{1,1}, w_{1,2}, \ldots, w_{1,8}]^T$ onto each antenna element of the antenna array 215-a, a signal port may be generated. If the weight (w) applied to each antenna element is equal to exp(iφl), where φ is the angle of antenna the respective antenna element in the antenna array 215-a, and l is the OAM mode index, then this OAM-formed port is equivalent OAM mode l. By using different OAM-formed weights exp(iφl'), where l'≠l, multiple OAM modes 225 (e.g., multiple OAM-formed weights) are generated.

In other words, the OAM mode 225-a (e.g., OAM Mode 1) may include a set of OAM-formed weights that are applied to the respective antenna elements of the antenna array 215-a to generate an OAM waveform. Different OAM modes 225-a, 225-b, 225-c (e.g., different OAM codeword sequences) may correspond to different OAM-formed ports (e.g., first OAM mode 225-a is associated with port 1, second OAM mode 225-b is associated with port 2, third OAM mode 225-c is associated with port 3).

For the purposes of the present disclosure, the terms "OAM modes," "OAM codewords," and like terms, may be used to refer to the azimuth modes of the OAM communication while the term "radial codeword sequences," and like terms, may be used to refer to different sets or sequences of weights that are applied to antenna elements in the radial direction in order to generate OAM communications.

Similarly, continuing with reference to FIG. 2, the second antenna array 215-b (e.g., OAM receiver) may also exhibit a UCA structure, and may include a quantity of Rx antenna element (numbered 1 through 8) evenly distributed around the antenna array 215-b in a circle. In some aspects, a channel between the respective devices (e.g., channel between the antenna arrays 215-a, 215-b) may be denoted or described using a channel estimation matrix H. In other words, the channel matrix may describe the channel from each Tx antenna element of the first antenna array 215-a to each Rx antenna element of the second antenna array 215-b. In this example, the OAM-formed channel matrix $\tilde{H}=H\cdot[w_1, w_2, \ldots, w_L]$, where any two columns of the channel estimation matrix $\tilde{H}$ are orthogonal to one another. In this regard, all the OAM channels have no crosstalk, and is one reason why OAM-based communication may be used to realize high-level spatial multiplexing degrees. Moreover, in some cases, central antenna elements at the centers of each of the respective antenna arrays (e.g., antenna elements at the center of the UCA antenna arrays 215) may be used alone to generate an OAM mode 0 (e.g., OAM mode 225-n).

Details of OAM communications and UCA antenna arrays may be further shown and described with reference to FIG. 3.

Figure 3:
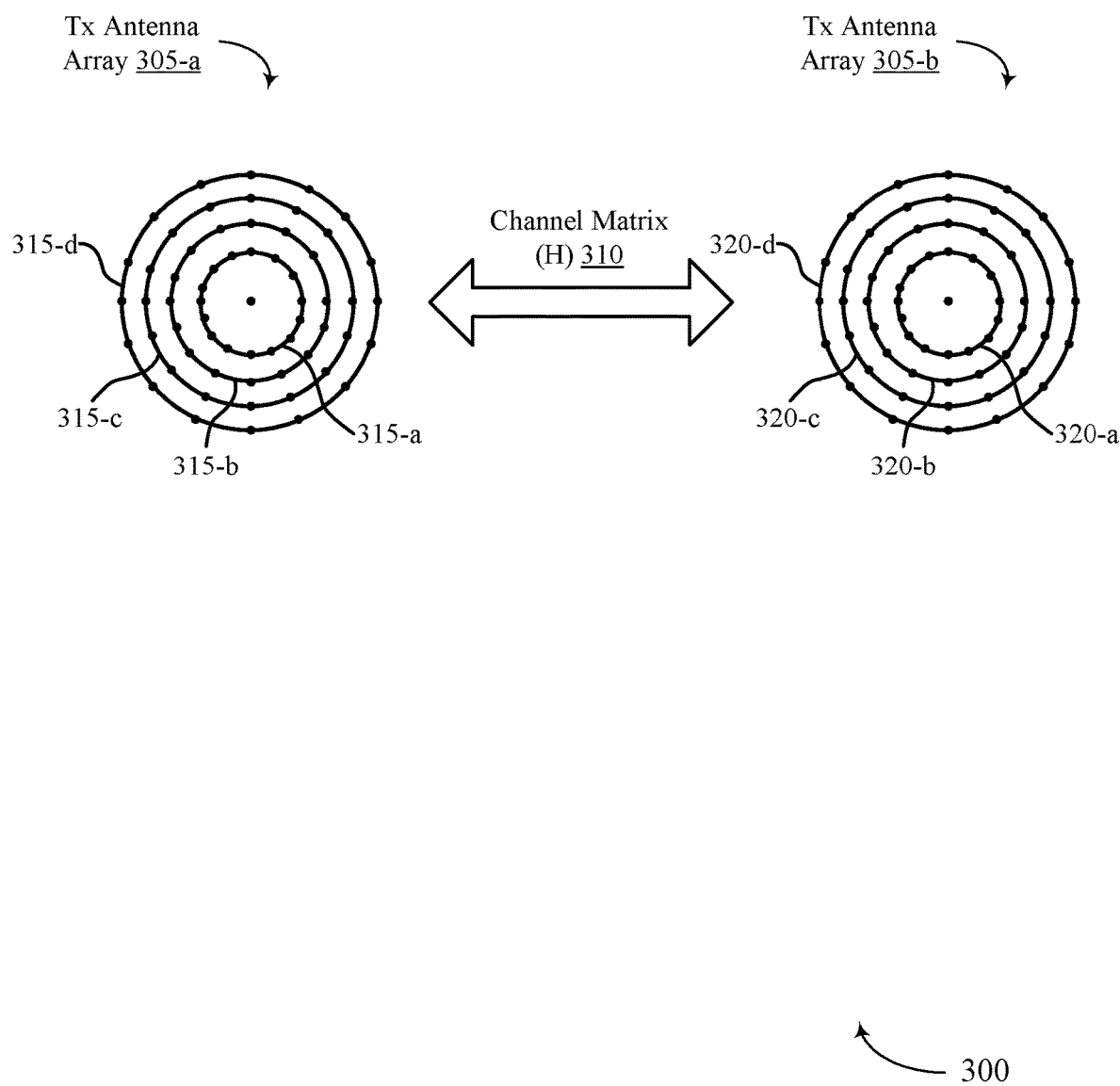
FIG. 3 illustrates an example of an OAM communications configuration that supports techniques for codeword-based radial beamforming for OAM waveforms in accordance with one or more aspects of the present disclosure.

FIG. 3 illustrates an example of an OAM communications configuration 300 that supports techniques for codeword-based radial beamforming for OAM waveforms in accordance with one or more aspects of the present disclosure. In some examples, aspects of the OAM communications configuration 300 may implement, or be implemented by, aspects of the wireless communications system 100, the wireless communications system 200, or both. In particular, the OAM communications configuration 300 illustrates techniques which may be used between devices to determine radial codeword sequences for OAM communications, as described herein.

The OAM communications configuration 300 illustrated in FIG. 3 depicts a first antenna array 305-a (e.g., Tx antenna array) and a second antenna array 305-b (e.g., Rx antenna array), which may be examples of the antenna arrays 215-a, 215-b illustrated in FIG. 2. As noted previously herein, a channel between the first antenna array 305-a and the second antenna array 305-b may be represented by a channel matrix 310. In some aspects, each of the antenna arrays 305 may include multiple co-axial UCA antenna circles. For example, the Tx antenna array 305-a may include a first Tx circle 315-a (Tx circle 1), a second Tx circle 315-b (Tx circle 2), a third Tx circle 315-c (Tx circle 3), and a fourth Tx circle 315-d (Tx circle 4). Similarly, the Rx antenna array 305-b may include a first Rx circle 320-a (Rx circle 1), a second Rx circle 320-b (Rx circle 2), a third Rx circle 320-c (Rx circle 3), and a fourth Rx circle 320-d (Rx circle 4).

In some cases, there are no specific requirements or restrictions on the radius of each Tx circle 315 and/or Rx circle 320. In some cases, the antenna elements of each respective antenna array 305 may be evenly spaced within the respective Tx circles 315 and Rx circles. Moreover, while the Tx antenna array 305-a and the Rx antenna array 305-b are shown as including the same quantities of antenna elements, this is solely for illustrative purposes. In particular, in some cases, the Tx antenna array 305-a and the Rx antenna array 305-b may include different quantities of antenna elements and/or Tx/Rx circles. In some implementations, the alignment between the Tx antenna array 305-a and the Rx antenna array 305-b may be co-axial and/or parallel (but where individual antenna elements within the respective Tx circles 315 and Rx circles may have offsets relative to one another.

In some aspects, intra-circle streams associated with the respective antenna arrays 305 may be orthogonal, where the inter-circle streams may be orthogonal with different OAM modes, and non-orthogonal within the same OAM mode. For each OAM mode, there exist inter-circle interferences. For example, when generating OAM multiplexing signals/waveforms, a Tx device may apply one or more streams of multiple OAM modes/radial codeword sequences to the first Tx circle 315-a, one or more streams of multiple OAM modes/radial codewords to the second Tx circle 315-b, one or more streams of multiple OAM modes/radial codeword sequences to the third Tx circle 315-c, and one or more streams of multiple OAM modes/radial codeword sequences to the fourth Tx circle 315-d.

An example may prove to be illustrative. In some cases, it may be assumed that a Tx device includes $M_1$ Tx circles 315, each with N antenna elements, and that an Rx device includes $M_2$ Rx circles 320, each with N antenna elements. Additionally, it may be assumed that the antenna elements of each Tx circle 315 and Rx circle 320 are uniformly placed, and that the alignment between the Tx device and the Rx device is co-axial and parallel, but where different antenna elements within the respective circles may have different offsets.

In this example, the organization of the channel matrix may be determined as a full matrix (e.g., element wise) or an intermediate matrix (e.g., circle wise), where the channel matrix (H) may be represented by Equation 1 below:

$$H = \begin{bmatrix} H_{1,1} & H_{1,2} & \cdots & H_{1,M_2} \\ H_{2,1} & H_{2,2} & \cdots & H_{2,M_2} \\ \cdots & \cdots & \cdots & \cdots \\ H_{M_1,1} & H_{M_2,1} & \cdots & H_{M_1,M_2} \end{bmatrix} \quad (1)$$

where the channel estimation matrix H is represented as an N×N circulant matrix with elements $(H_{M_1, M_2})N^2$ represent the complex channel gain between the Tx and Rx antenna pairs $N_1N_2$.

Continuing with reference to Equation 1 above, there may be separability of the azimuth and radial modes. In some cases, the modes may not be totally separated because radial modes are different for each azimuth mode. In the context of partial separability, the (mn)*(mn) matrix may degenerate into a m*m matrix (circle-wise). In the context of sequential separability, Azimuth modes may be invariant, where radial modes may be dependent on azimuth modes. The number of modes in each direction may be independent, depending on the number of circles 315, 320 and antenna elements in the circles. The degree of separability may be a consequence of the circular symmetry of the Tx circles 315 and Rx circles 320.

Analyzing MIMO modes, azimuth modes may be labeled from 0 to (N−1). Moreover, beamforming vectors may be represented as singular vectors, as illustrated in Equation 2 and Equation 3 below:

$$e_p = \left\{ \exp\left(\frac{j2\pi pq}{N}\right) \right\} \quad (2)$$

$$e'_p = \left\{ \exp\left(\frac{j2\pi p'q'}{N}\right) \right\} \quad (3)$$

where Equation 2 represents the $p^{th}$ DFT vector at the Tx device, and where Equation 3 represents the $p^{th}$ DFT vector at the RTx device, and where p=0,1, . . . , (N−1), q=0,1, . . . (N−1), N=min($N_1$, $N_2$), p'=0,1, . . . , (N−1), q'=0,1, . . . (N−1). In this example, (partial) beam strength may be represented by singular values, as illustrated in the $p^{th}$ DFT of row (or vector, depending on the dimension) vector in $H_{m_1,m_2}$.

Comparatively, radial modes may be labeled from 0 to (M−1), with M=min($M_1$, $M_2$).) for each of the azimuth mode. Moreover, beamforming vectors may be represented as singular vectors (e.g., Tx: left singular vectors), as illustrated in Equation 4 below:

$$\begin{bmatrix} h_{11,p} & h_{12,p} & \cdots & h_{1M_2,p} \\ h_{21,p} & h_{22,p} & \cdots & h_{2M_2,p} \\ \cdots & \cdots & \cdots & \cdots \\ h_{M_1 1,p} & h_{M_1 2,p} & \cdots & h_{M_1 M_2,p} \end{bmatrix} \quad (4)$$

where $h_{m_1 m_2, p}$ is the $p^{th}$ singular value of the block matrix $H_{m_1 m_2} e_p = h_{m_1 m_2, p} e_p$. The receive may be represented as right singular vectors of the same matrix illustrated in Equation 4 above. The complete beam strength may be represented/determined based on the singular values of the above matrix, where the codeword-based beamforming may avoid the calculation of SVD of the reduced matrix.

Reference will again be made to the wireless communications system 200 illustrated in FIG. 2.

In some cases, there may potentially be a large quantity of candidate radial codeword configurations or formats that may be used to form OAM waveforms. However, such large quantities of candidate radial codeword configurations may complicate the ability of Rx devices to provide feedback to adjust radial codeword sequences (as well as increase the size/complexity of feedback for adjusting radial codeword sequences). In other words, numerous candidate radial codeword formats may also result in numerous types of information that the Rx device may feed back to the Tx device to adjust the radial codeword sequences, thereby resulting in increased processing complexity for determining radial codeword sequences for OAM transmissions.

Accordingly, aspects of the present disclosure are directed to techniques for identifying radial codeword sequences for OAM communications. Radial codeword sequences based on Slepian sequences may provide suitable radial codeword sequences to the orthogonality over a finite aperture. Moreover, quantized and truncated Laguerre polynomials are another candidate for OAM radial codeword sequences. For both sets of radial codeword sequences, scaling factors based on geometric parameters such as Tx/Rx distance and antenna panel sizes are important for the mode determination, where such scaling factors may be fed back between devices (e.g., first wireless device 205-a, second wireless device 205-b) based on measurements or some other configuration. In some aspects, techniques described herein may enable the wireless devices 205 to determine OAM radial codeword sequences/modes in cases where the wireless devices 205 do or do not have geometric parameters knowledge.

In some implementations, aspects of the present disclosure may be implemented in the context of wireless fronthaul links with in-band or out-of-band deployment. Additionally, or alternatively, aspects of the present disclosure may be implemented in backhaul access links with LoS between Tx and Rx antenna arrays 215. For example, aspects of the present disclosure may be implemented in the context of a distributed unit (DU) (e.g., DU of a network entity 105) deployed with a single aperture array that connects to a single (or multiple) wireless RU or other nodes, such as IAB nodes, repeaters, and the like. Further aspects of the present disclosure may be implemented in cases with angular offsets between Tx and Rs antenna array 215 apertures for LOS MIMO.

Some aspects of the present disclosure are directed to techniques for determining OAM radial codeword sequences that may be used for OAM communications, where the OAM radial codeword sequences may be associated with polynomial-based configurations. Polynomial radial codeword configurations described herein may include, but are not limited to, Laguerre polynomials and Slepian polynomials. Each of these alternatives will be discussed in turn.

In the context of Laguerre polynomial-based radial codeword sequences, OAM waveforms may be derived with Maxwell and/or Helmholtz equations. For example, Maxwell equations as vector equations, in free space without any free charge, may be solved by a scalar form, such as the Helmholtz equation illustrated as Equation 5 below:

$$\nabla^2 v + k^2 v = 0 \qquad (5)$$

Assuming a paraxial wave $v = u e^{ikz}$, and assuming the variation of amplitude u in the z direction (e.g., direction of propagation) is slow, and dropping the term $\partial^2/\partial z^2 u$, the Helmholtz equation illustrated as Equation 5 above becomes Equation 6 below:

$$i\frac{\partial}{\partial z}u = -\frac{1}{2k}\left(\frac{\partial^2}{\partial x^2} + \frac{\partial^2}{\partial y^2}\right)u \qquad (6)$$

where there are two potential approaches for solving the partial differential equation illustrated in Equation 6 above: (1) a differential solution, and (2) an integral solution (e.g., Green function and Huygens-Fresnel Principle).

Solutions for OAM waveforms in polar coordinates may be expressed or defined as Laguerre polynomials. For example, Laguerre-Gaussian modes/waveforms may be described or illustrated in cylindrical polar coordinates, as shown in Equation 7 below:

$$u_{\ell,p} = \sqrt{\frac{2p!}{\pi(p+|\ell|)!}}\frac{1}{w(z)}\left(\frac{\rho\sqrt{2}}{w(z)}\right)^{|\ell|}\exp\left(\frac{-\rho^2}{w^2(z)}\right)L_p^{|\ell|}\left(\frac{2\rho^2}{w^2(z)}\right) \qquad (7)$$

$$e^{i\ell\phi} \times \exp\left(-ik\frac{\rho^2 z}{2(z_R^2+z^2)}\right)\exp\left[-i(2p+|\ell|+1)\tan^{-1}\left(\frac{z}{z_R}\right)\right]_p^{|\ell|}$$

where $L_p^{|\ell|}$ is an associated Laguerre polynomial, z is the distance 220 between the wireless devices 205/antenna arrays 215, $z_R = kw^2(0)/2$ is the Rayleigh range (a measure of the tightness of the focus, and $w(z) = w(0)\sqrt{1+z^2/z_R^2}$ is the beam width (e.g., w(0) is the beam waist/width at z=0).

The azimuth phase term $e^{i\ell\phi}$ may provide the link to the term "OAM" from both classic electromagnetic wave theory and quantum mechanics. A special case at a Tx device (e.g., first wireless device 205-a) with z=0 is illustrated via Equation 8 and Equation 9 below:

$$u_{\ell,p} \propto \rho^{|\ell|}\exp\left(\frac{-\rho^2}{w^2(0)}\right)L_p^{|\ell|}\left(\frac{2\rho^2}{w^2(0)}\right)e^{i\ell\phi} \qquad (8)$$

$$L_p^l(x) = \sum_{k=0}^{p}(-1)^k\binom{p+l}{p-k}\frac{x^k}{k!} \text{ (for } p \geq 0\text{)} \qquad (9)$$

In the context of Laguerre polynomials, there may be some practical constraints at both Tx devices (e.g., first wireless device 205-a) and Rx devices (e.g., second wireless device 205-b). Practical constraints may include, but are not limited to, polynomials of finite size 9 e.g., all Laguerre polynomials are truncated), discrete circles (e.g., all Laguerre polynomials are discretely sampled), and beam waist/width parameters (e.g., w(z) and w(0)) may not be known at the respective Tx and Rx devices to start. As such, mode strengths may therefore be unknown at the respective Tx and Rx devices without knowledge of w(z) and w(0).

In some cases, the Tx wireless device 205-a may be configured to generate OAM waveforms using multiple modes (e.g., OAM modes 225, OAM radial codeword sequences), where both azimuth and radial modes are geometrically aligned according to the above Laguerre—Gaussian solution with truncation and quantization. In such cases, the Tx wireless device 205-a may be configured to determine certain parameters associated with the OAM waveforms/signals to be transmitted, including an initial beam waist/width (w(0)), the specific OAM modes 225/OAM radial codeword sequences, and the associated power allocation(s) for the antenna elements and/or OAM modes 225 (e.g., power allocation for respective OAM radial codeword sequences).

In some cases, the amplitude u and the associated Laguerre polynomial $L_p^l(x)$ at the nth Tx circle of the first antenna array 215-a may be defined according to Equation 10 and Equation 11 below:

$$u_{\ell,p} \propto \left(\frac{r_{1,n}}{w(0)}\right)^{|\ell|}\exp\left(\frac{-r_{1,n}^2}{w^2(0)}\right)L_p^{|\ell|}\left(\frac{-r_{1,n}^2}{w^2(0)}\right)e^{i\ell\phi} \qquad (10)$$

$$L_p^l(x) = \sum_{k=0}^{p}(-1)^k\binom{p+l}{p-k}\frac{x^k}{k!} \text{ (for } p \geq 0\text{)} \qquad (11)$$

The measurement/determination of the distance 220 between the respective wireless devices 205/antenna arrays 215 may be used to determine one or more parameters of the equations illustrated above, such as the beam width/waist w(z). In some cases, there may be multiple methods or implementations that enable the wireless devices 205 to measure the distance 220 (measure z), including round-trip-time (RTT) measurements, phase difference measurements across antenna elements in the Tx and Rx antenna arrays 215, and the like. However, some aspects of the present disclosure are directed to techniques which enable the wireless devices 205 to determine/select OAM modes (e.g., OAM modes 225) and radial codeword sequences without the wireless devices 205 having prior knowledge of the distance 220 (e.g., without knowing z).

In particular, some aspects of the present disclosure are directed to different techniques or implementations for determining radial codeword sequences (e.g., OAM modes 225) for MIMO-based OAM communications along the radial dimension with Laguerre polynomials. In accordance with a first implementation, the wireless devices 205 may be able to determine a radial codeword sequence for OAM transmissions between the respective devices in cases where the distance 220 (z) between the devices is unknown. In such cases, the first wireless device 205-a (e.g., Tx device) may select an initial value for w(0) and an initial set of OAM modes 225 and radial codeword sequences {l, p} for OAM signals 230 that are transmitted to the second wireless device 205-b. In other words, the Tx device may select an initial term value for the beam width/waist. In some cases, the first wireless device 205-a may transmit OAM signals 230 using OAM mode 0 with amplitude $\exp(-r_{1,n}^2/w^2(0))$.

The Rx device (e.g., second wireless device 205-b) may be configured to determine w(z) based on the amplitude of received OAM signals 230 across $r_{2,n}$. The amplitude of OAM signals 230 transmitted using Mode 0 (e.g., OAM mode 225) may be expressed as exp $$\left(\frac{-r_{2,n}^2}{w^2(z)}\right),$$

where the amplitude for Mode {l, p} (e.g., OAM modes 225 and radial codeword sequences) may be expressed by Equation 12 below:

$$\text{Mode/Codeword}(l, p) \propto \left(\frac{r_{2,n}}{w(z)}\right)^{|l|} \exp\left(\frac{-r_{2,n}^2}{w^2(n)}\right) \frac{-r_{2,n}^p}{p!} \quad (12)$$

where w(z) may be found by fitting the amplitude of received OAM signals with the curve represented by the equations above, and where the amplitude peaks for Mode {l, p} may be indicative of w(z).

Continuing with the same example above, the Rx device (e.g., second wireless device 205-b) may be configured to determine a new value of w'(z) (e.g., a new value of the Laguerre polynomial for the beam waist/width), and may transmit a feedback message 235 to the Tx device 205-a, where the feedback message 235 indicates the new value of w'(z) (and/or the ratio of [w'(z)/w(z)].

In other words, the Rx device may calculate the initial value of w(z) that was used by the Tx device to transmit the OAM signals 230, and may feed back a new value of w'(z) that may improve a performance of subsequent OAM signals 230 transmitted by the Tx device. In some cases, the feedback message 235 may additionally or alternatively indicate other parameters/characteristics associated with OAM communications between the respective devices, including a set of radial codeword sequences/modes {l,p} (e.g., "preferred" OAM radial codeword sequences/OAM modes 225), power allocations (e.g., Tx power allocation) among the radial codeword sequences/OAM modes 225, and the like. In some cases, it may appear that smaller w'(z) may always be preferred to scale all the radial codeword sequences/OAM modes 225 toward to the origin such that more energy is captured. However, this may not always be the case in practice, as the discrete circles (e.g., discrete Tx circles 315, discrete Rx circles 320) close to the origin may not capture more energy with decreasing values of w'(z).

For a chosen set of OAM radial codeword sequences/OAM modes 225 (e.g., modes {l, p}), the total throughput of OAM signals 230 may be calculated according to Equation 13 below:

$$\text{Total Throughput} = \sum_l \sum_p R\left\{\frac{\sum_n E_{l,p} N_n \left(\frac{r_{1,n}}{w'(z)}\right)^{|2l|} \exp\left(\frac{-2r_{1,n}^2}{w'^2(z)}\right)\left[L_p^{|l|}\left(\frac{-r_{1,n}^2}{w^2(z)}\right)\right]^2}{\sigma_t^2}\right\} \quad (13)$$

where $$\left(\frac{r_{1,n}}{w'(z)}\right)^{|2l|} \exp\left(\frac{-2r_{1,n}^2}{w'^2(z)}\right)\left[L_p^{|l|}\left(\frac{-r_{1,n}^2}{w^2(z)}\right)\right]^2$$

is the energy for radial codeword sequence/mode (l,p) at Tx circle n, $E_{l,p}$ is the energy for radial codeword sequence/mode (l,p), $N_n$ is the number of antenna elements within Tx circle n (where different $N_n$ are allowed for each circle), $\sigma_t^2$ is the thermal noise variance, and R {.} is the rate for a mode as a function of SNR. It is noted herein that energy may be always evenly distributed across radial codewords/OAM modes 225 (or at least among non-zero modes) in some designs.

Upon receiving the feedback message 235, the Tx device (e.g., first wireless device 205-a) may determine the value of the beam waist/width term of the Laguerre polynomial configuration (e.g., Laguerre polynomial radial codeword configuration) based on the indication of the new value w'(0) and/or the ratio (e.g., w'(0)=w(0)/[w'(z)/w(z)]) indicated via the feedback message 235. The first wireless device 205-a may additionally or alternatively determine the new value of w'(0) based on one or more additional parameters or considerations, such as minimum/maximum constraints on the beam waist/width value w'(0). Moreover, the Tx device may additionally consider the set of radial codeword sequences/OAM modes 225 used to transmit the OAM signals 230, and an energy distribution used to transmit the OAM signals to the Rx device.

This process in which the first wireless device 205-a transmits OAM signals 230 using a value of w for radial codeword sequence(s) defined by a Laguerre polynomial, and the second wireless device 205-b transmitting a feedback message 235 indicating a new value of w, may be repeated iteratively for any quantity of loops or repetitions. That is, the Rx device may iteratively repeat the estimation and parameter determination procedure described above, and transmit a feedback message 235 indicating the result, The iterative process for communicating OAM signals 230 and responsive feedback messages 235 used to determine radial codeword sequences for OAM communications between the devices may be performed for a pre-defined or signaled time period/duration, for a pre-determined quantity of iterations, or both. Additionally, or alternatively, the iterative process for communicating OAM signals 230 and responsive feedback messages 235 used to determine radial codeword sequences for OAM communications may be performed until the values of w'(0) indicated within sequential feedback messages 235 is less than some threshold (e.g., until the fed-back values of w'(0) is sufficiently small).

The foregoing description may be utilized by the respective wireless devices 205 to determine radial codeword sequences for OAM signals 230 using Laguerre polynomials when the distance 220 between the devices is known. In accordance with a second implementation, the wireless devices 205 may be able to determine a radial codeword sequence for OAM transmissions between the respective devices in cases where the distance 220 (z) between the devices is measured and known.

For example, in cases where the value of z is known (e.g., known distance 220), the Tx device (e.g., first wireless device 205-a) may select an initial value of w(0) for the Laguerre polynomial, and/or an initial set of radial codeword sequences/OAM modes 225 (e.g., modes {l,p}) based on the known value of z (based on distance 220). The first wireless device 205-a may then transmit OAM signals 230 using the selected value of w(0) and/or selected radial codeword sequences/OAM modes.

In cases where the first wireless device 205-a (e.g., Tx device) knows the radius of the Tx circle(s) 315, a quantity of antenna elements within the antenna array 215-a and/or Tx circle 315, or any combination thereof, the first wireless device 205-a may also determine the set of radial codeword sequences/OAM modes 225 for the OAM signals 230 which will improve (e.g., optimize) the energy distribution of the OAM signals 230. In such cases, the Tx device may perform a procedure similar to the parameter determination procedure performed at the Rx device, as described above, and illustrated in Equation 14 and Equation 15 below:

$$w(z) = w(0)\sqrt{1 + z/z_R^2} \tag{14}$$

$$Z_R = \frac{kw^2(0)}{2} \tag{15}$$

Continuing with the same example above, the second wireless device 205-b may estimate the value of w(z) used to communicate the OAM signals 230 based on the received amplitude of the OAM signals 230 across $r_{2,n}$. The Rx device (e.g., second wireless device 205-b) may then be configured to determine a new value of w'(z) (e.g., a new value of the Laguerre polynomial for the beam waist/width), and may transmit a feedback message 235 to the Tx device 205-a, where the feedback message 235 indicates the new value of w'(z) (and/or the ratio of [w'(z)/w(z)]. In other words, the Rx device may calculate the initial value of w(z) that was used by the Tx device to transmit the OAM signals 230, and may feed back a new value of w'(z) that may improve a performance of subsequent OAM signals 230 transmitted by the Tx device.

As described previously herein, in some cases, the feedback message 235 may additionally or alternatively indicate other parameters/characteristics associated with OAM communications between the respective devices, including a set of radial codeword sequences/modes {l,p} (e.g., "preferred" OAM radial codeword sequences/OAM modes 225), power allocations (e.g., Tx power allocation) among the radial codeword sequences/OAM modes 225, and the like. Similarly, upon receiving the feedback message 235, the Tx device (e.g., first wireless device 205-a) may determine the value of the beam waist/width term of the Laguerre polynomial configuration based on the indication of the new value w'(0) and/or the ratio (e.g., w'(0)=w(0)/[w'(z)/w(z)]) indicated via the feedback message 235. The first wireless device 205-a may additionally or alternatively determine the new value of w'(0) based on one or more additional parameters or considerations, such as minimum/maximum constraints on the beam waist/width value w'(0). Moreover, the Tx device may additionally consider the set of radial codeword sequences/OAM modes 225 used to transmit the OAM signals 230, and an energy distribution used to transmit the OAM signals 230 to the Rx device.

Once again, the process in which the first wireless device 205-a transmits OAM signals 230 using a value of w for radial codeword sequence(s) defined by a Laguerre polynomial, and the second wireless device 205-b transmitting a feedback message 235 indicating a new value of w, may be repeated iteratively for any quantity of loops or repetitions, such as for a pre-defined or signaled time period/duration, for a pre-determined quantity of iterations, until the values of w'(0) indicated within sequential feedback messages 235 is less than some threshold (e.g., until the fed-back values of w'(0) is sufficiently small), or any combination thereof.

Additional or alternative aspects of the present disclosure are directed to techniques for determining radial codeword sequences for OAM signals 230 using Slepian polynomials (e.g., Slepian function-based radial codeword sequences). In the context of Slepian based polynomials, and based on the theory of Green function (waveform from a single point source with the same boundary condition), Equation 5 from above may be solved in an integral form, which may be the equivalent of the Huygens-Fresnel principle. For example, solving Equation 5 in integral form, the signal at a receiver plane v may be written as a function of a transmitter signal U according to Equation 16 below:

$$v = \iint U \exp(jkr)/r \, dS \tag{16}$$

where the impact from incident and propagation angles is ignored.

Expanding on Equation 16 above may yield Equation 17 and Equation 18 below:

$$\frac{\exp(jkr)}{r} = \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_l - r_2\sin\theta_2)^2}} \tag{17}$$

$$\frac{\exp(jkr)}{r} = \frac{\exp\left\{jk\sqrt{z^2 + r_1^2 + r_2^2 - 2r_1r_2\cos(\theta_1 - \theta_2)}\right\}}{\sqrt{z^2 + r_1^2 + r_2^2 - 2r_1r_2\cos(\theta_1 - \theta_2)}} \tag{18}$$

Based on circular symmetry, it may be assumed that $\theta_2=0$, which may be substituted into equations above to yield Equation 19 below:

$$\frac{\exp(jkr)}{r} = \frac{\exp\left\{jk\sqrt{z^2 + r_1^2 + r_2^2 - 2r_1r_2\cos\theta}\right\}}{\sqrt{z^2 + r_1^2 + r_2^2 - 2r_1r_2\cos\theta}} \tag{19}$$

It is noted herein that the channel matrix (e.g., channel estimation matrix for the channel between the first antenna array 215-a and the second antenna array 215-b) is cyclic, which implies that eigenvectors of the channel matrix are DFT vectors, as represented by Equation 20 below:

$$v_\mu = \exp\{j2\pi\mu v/N\}, \mu=0,1,\ldots(N-1), v=0,1,\ldots(N-1) \tag{20}$$

where μ is the vector index of DFT vector, and v is the element index in each DFT vector.

Comparing the DFT vectors to the radial codeword sequences/OAM modes 225 illustrated in FIG. 2, the $\mu^{th}$ DFT vector may correspond to (e.g., represent) $\mu^{th}$ OAM waveform. In some aspects, the radial codeword sequences/OAM modes 225 may exhibit an orthogonality property. For example, with N Tx antenna elements within the first antenna array 215-a and N Rx antenna elements within the second antenna array 215-b, all radial codeword sequences/OAM modes 225 (e.g., 0, 1, . . . , N−1) may be orthogonal at Rx device (e.g., second wireless device 205-b) if any are transmitted, regardless of distance 220 (e.g., distance z) and radii of the Tx and Rx circles at the respective antenna arrays 215, 305.

The mode response (e.g., DFT structure) of each Tx-Rx circle pair (e.g., pair of Tx circle 315 and Rx circle 320) may be analyzed using Taylor expansion approximations, as illustrated in Equations 21-24 below:

$$\sqrt{z^2 + r_1^2 + r_2^2 - 2r_1 r_2 \cos\theta} = Z\sqrt{1 + \frac{r_1^2 + r_2^2 - 2r_1 r_2 \cos\theta}{z^2}} \quad (21)$$

$$z\sqrt{1 + \frac{r_1^2 + r_2^2 - 2r_1 r_2 \cos\theta}{z^2}} \approx z\left(1 + \frac{r_1^2 + r_2^2 - 2r_1 r_2 \cos\theta}{2z^2}\right) = \quad (22)$$

$$z + \frac{r_1^2 + r_2^2}{2z} - \frac{r_1 r_2 \cos\theta}{z} \quad (23)$$

$$\frac{\exp(jkr)}{r} = \propto \frac{\exp\left\{jk\sqrt{z^2 + r_1^2 + r_2^2 - 2r_1 r_2 \cos\theta}\right\}}{\sqrt{z^2 + r_1^2 + r_2^2 - 2r_1 r_2 \cos\theta}} \approx$$

$$\frac{\exp\left\{jkz\sqrt{1 + \frac{r_1^2 + r_2^2 - 2r_1 r_2 \cos\theta}{z^2}}\right\}}{z + \frac{r_1^2 + r_2^2}{2z} - \frac{2r_1 r_2 \cos\theta}{z}}$$

$$\approx \frac{\exp\left\{jk\left(z + \frac{r_1^2 + r_2^2}{2z}\right)\right\}}{z} \exp\left\{\frac{-jk r_1 r_2 \cos\theta}{z}\right\} \quad (24)$$

Performing an analysis on integrals with finite apertures may be performed starting from the integral expression represented in Equation 25 and Equation 26 below:

$$\int_0^{2\pi}\int_0^\infty U(r,\theta)\exp\left\{-\frac{j2\pi r_1 r_2}{\lambda z}\cos\theta\right\} \frac{\exp\left\{jk\left(z + \frac{r_1^2 + r_2^2}{2z}\right)\right\}}{z} r_1 dr_1 d\theta \quad (25)$$

$$\int_0^{2\pi}\int_0^\infty U(r,\theta)\exp\left\{-\frac{j2\pi r_1 r_2}{\lambda z}\cos\theta\right\} \frac{\exp\left\{jk\left(z + \frac{r_1^2 + r_2^2}{2z}\right)\right\}}{z} r_1 dr_1 d\theta = \quad (26)$$

$$\frac{\exp\left\{jk\left(z + \frac{r_2^2}{2z}\right)\right\}}{z}$$

$$\int_0^{2\pi}\int_0^\infty U(r_1)\exp\left(jk\frac{r_1^2}{2z}\right)U(\theta)\exp\left\{-\frac{j2\pi r_1 r_2}{\lambda z}\cos\theta\right\} r_1 dr_1$$

Letting $U(\theta) = e^{il\theta}$, and lumping exp $$\left(jk\frac{r_1^2}{2z}\right)$$

into $U(r_1)$ by defining $\tilde{U}(r_1)$ may result in Equation 27 below:

$$\int_0^\infty \tilde{U}(r_1) r_1 dr_1 \int_0^{2\pi} e^{il\theta}\exp\left\{-\frac{j2\pi r_1 r_2}{\lambda z}\cos\theta\right\} \propto \quad (27)$$

$$\int_0^\infty J_l\left(\frac{2\pi r_1 r_2}{\lambda z}\right)\tilde{U}(r_1) r_1 dr_1$$

Due to finite size, $r_1 \leq R_1$, $r_2 \leq R_2$, and for convenience of analysis, we may define $r' = r_1/R_1$, $r = r_2/R_2$, and $c = 2\pi R_1 R_2/\lambda z$, where eigenfunctions with finite apertures may be defined according to Equation 28 below:

$$\beta \tilde{U}(r) = \int_0^1 J_l(crr')\tilde{U}(r')r' dr' \quad (28)$$

To conform to Stern-Liouville eigenvalue function, we may define $\varphi(r) = \sqrt{r}R(r)$, and $\gamma = \sqrt{r}\beta$, which may yield Equation 29 below:

$$\gamma\varphi(r) = \int_0^1 J_l(crr')\varphi(r')\sqrt{crr'}\, dr' \quad (29)$$

There are discrete eigenvalues of $\gamma_{l,p}$ and the corresponding eigenfunctions $\varphi_{l,p}(r)$, which may be referred to as generalized prolate spheroidal functions (GPSF), which may be analyzed by Slepian functions according to Equation 30 and Equation 31 below:

$$\gamma_{l,p} = \frac{c^{l+\frac{1}{2}} d_0^{l,p}}{2^{l+1}\Gamma(l+2)\sum_{j=0} d_j^{l,p}}, \quad (30)$$

$$\varphi_{l,p}(r) = \frac{1}{\gamma_{l,p}}\sum_{j=0}^\infty d_j^{l,p} \frac{J_{l+2j+1}(cr)}{\binom{l+j}{j}\sqrt{cr}} \quad (31)$$

where $d_j^{l,p}$ can be determined recursively according to Equations 232-34 below:

$$c^2 \gamma_{l,j-1}^{(1)} d_{j-1}^{l,p} + \left[c^2 \gamma_{l,j}^{(0)} + \left(2j+l+\frac{1}{2}\right)\left(2j+l+\frac{3}{2}\right) - \chi(c)\right]d_j^{l,p} + \quad (32)$$

$$c^2 \gamma_{l,j+1}^{(-1)} d_{j+1}^{l,p} = 0$$

$$\gamma_{l,j}^{(1)} = -\frac{(j+l+1)^2}{(2j+l+1)(2j+l+2)}, \quad (33)$$

$$\gamma_{l,j}^{(0)} = \frac{1}{2}\left(1 + \frac{l^2}{(2j+l)(2j+l+2)}\right), \gamma_{l,j}^{(-1)} = -\frac{j^2}{(2j+l)(2j+l+1)}$$

$$\chi(c) = \chi_{l,j}(c) = \quad (34)$$

$$\chi_{l,j}(0) + \sum_{i=0}^\infty c^{2i} a_i(l,j) = \left(2j+l+\frac{1}{2}\right)\left(2j+l+\frac{3}{2}\right) + \sum_{i=0}^\infty c^{2i} a_i(l,j)$$

The respective terms illustrated in Equations 32-34 above may be defined according to Equations 35-37 below:

$$a_i(l,j) = \sum_{k=-1}^1 A_{-k}^{(j-1)}(l,j)\gamma_{l,j-k}^{(k)} \quad (35)$$

$$[\chi_{l,j+m}(0) - \chi_{l,j}(0)]A_m^{(i)}(l,j) = \quad (36)$$

$$\sum_{k=1}^j a_k(l,j)A_m^{(i-k)}(l,j) - \sum_{k=-1}^1 A_{-k+m}^{(i-1)}(l,j)\gamma_{l,j-k+m}^{(k)}$$

$$A_m^{(0)}(l,j) = 0, m \neq 0, A_0^{(0)}(l,j) = 1, a_0(l,j) = 0 \quad (37)$$

In some implementations, Equations 30 and 31 above may be plotted, where the peak in amplitude $\varphi_{l,p}(r)$ is associated with the value of c and can be used to estimate the value of c. In other words, the Rx device may be configured to receive the OAM signals 230 and estimate the value of c for the Slepian polynomial in order to determine radial codeword sequences/OAM modes 225 for subsequent OAM signals 230 between the devices.

In some aspects, eigenvalues determined by the Rx and/or Tx devices may provide vectors for improved beamforming, as such eigenvalues may improve (e.g., maximize) channel capacity between the respective devices. GPSF as eigenfunctions with finite apertures may provide a desirable candidate for beamforming radial codewords in the context of OAM communications. In the context of UCA antenna arrays 215, GPSF may be sampled by the multiple circles (e.g., Tx circles 315 and Rx circles 320 illustrated in FIG. 3). GPSF themselves are not strictly limited to the finite domain of $r \leq 1$ since the uncertainty principle implies that no functions can be limited in both space and frequency domains. However, the eigen function property may still ensure a large portion of the signal waveform is captured within the finite apertures, as reflected in Equation 29 above.

Techniques described herein may utilize radial codeword-based MIMO transmissions along the radial dimension with GPSF. In particular, in the context of radial codeword sequences based on Slepian polynomials, the wireless devices 205 may exchange OAM signals 230 and feedback messages 235 in order to determine a critical parameter $c = 2\eta R_1 R_2 / \lambda z$ for the Slepian polynomial (e.g., value for polynomial term c). In such cases, $R_1$ and $R_2$ may be fixed (although the Tx device and/or the Rx device may change such terms based on power, processing capability considerations, etc.), and where the distance 220 (distance z) z needs to be measured.

For example, in the case of an unknown z (e.g., distance 220 is unknown), the value c for the polynomial function may also be unknown. As such, the Tx device (e.g., first wireless device 205-a) may select an initial value of c and an initial set of radial codeword sequences/OAM modes 225 (e.g., modes $\{l,p\}$), and may transmit OAM signals 230 using the initial value of c and the initial set of radial codeword sequences. In this example, the Rx device (e.g., second wireless device 205-b) may determine the value of c based on the received amplitude of the OAM signals across $r_{2,n}$. As described previously herein, the location of peaks of $\varphi_{l,p}(r_2)$ is a function of c and can be used to estimate the actual value of c used by the Tx device.

Continuing with the same example, the Rx device may determine a new value of c, and may transmit a feedback message 235 indicating the new value of c (and/or a ratio of the new c value to the initial c value). Additionally, or alternatively, the Rx device may indicate, via the feedback message 235, one or more radial codeword sequences/OAM modes 225 (e.g., set of preferred OAM modes $\{l,p\}$), power allocation information across the radial codeword sequences/OAM modes 225 for the Tx device, and the like. In this example, the Tx device may determine the value of c based on the feedback message 235. The Tx device may additionally consider the set of radial codeword sequences/OAM modes 225 and energy distribution. Subsequently, the Tx device may transmit OAM signals 230 to the Rx device according to the new value of c.

Once again, the process in which the first wireless device 205-a transmits OAM signals 230 using a value of c for radial codeword sequence(s) defined by a Slepian polynomial, and the second wireless device 205-b transmitting a feedback message 235 indicating a new value of c, may be repeated iteratively for any quantity of loops or repetitions, such as for a pre-defined or signaled time period/duration, for a pre-determined quantity of iterations, until the values of c indicated within sequential feedback messages 235 is less than some threshold (e.g., until the fed-back values of c is sufficiently small), or any combination thereof.

By way of another example, in cases where the distance 220 is known (e.g., z known), the Tx device (e.g., first wireless device 205-a) may be configured to select an initial value for c (and an initial set of radial codewords/OAM modes 225 $\{l,p\}$) based on the known value of z (e.g., based on distance 220). In some aspects, the Tx device may determine the set of radial codeword sequences/OAM modes 225 in such a manner as to optimize energy distribution of OAM signals 230. Subsequently, the Tx device may transmit OAM signals 230 to the Rx device based on the initial value of c and the initial set of radial codeword sequences.

Continuing with the same example, the Rx device may estimate the value of c based on the amplitude of OAM signals across $r_{2,n}$, and may determine a new value of c. The Rx device may feed back the new value of c (and/or a ratio of the new and initial c values) via the feedback message 235. Once again, the process in which the first wireless device 205-a transmits OAM signals 230 using a value of c for radial codeword sequence(s) defined by a Slepian polynomial, and the second wireless device 205-b transmitting a feedback message 235 indicating a new value of c, may be repeated iteratively for any quantity of loops or repetitions, such as for a pre-defined or signaled time period/duration, for a pre-determined quantity of iterations, until the values of c indicated within sequential feedback messages 235 is less than some threshold (e.g., until the fed-back values of c is sufficiently small), or any combination thereof.

Techniques described herein may enable wireless devices to negotiate radial codeword sequences that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codeword sequences for OAM communications, thereby improving resource utilization, and decreasing power consumption at the respective devices.

Figure 4:
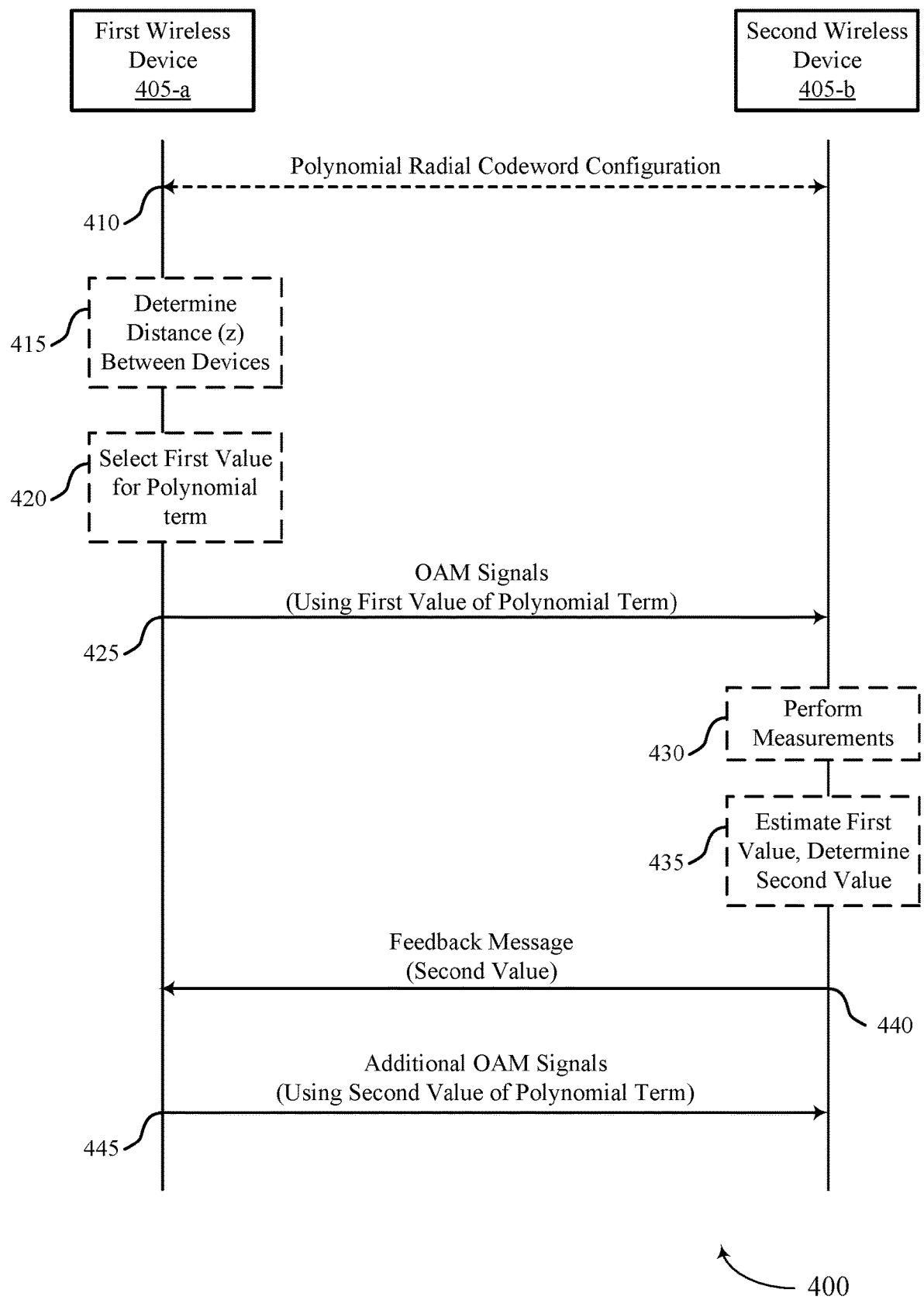
FIG. 4 illustrates an example of a process flow that supports techniques for codeword-based radial beamforming for OAM waveforms in accordance with one or more aspects of the present disclosure.

FIG. 4 illustrates an example of a process flow 400 that supports techniques for radial codeword-based radial beamforming for OAM waveforms in accordance with one or more aspects of the present disclosure. In some examples, the process flow 400 may implement, or be implemented by, aspects of wireless communications systems 100, the wireless communications system 200, the OAM communications configuration 300, or any combination thereof. For example, process flow 400 illustrates signaling and configurations that enable wireless devices to determine radial codeword sequences for OAM communications based on polynomial-based radial codeword configurations, as described with reference to FIGS. 1-3.

The process flow 400 includes a first wireless device 405-a and a second wireless device 405-b, which may be examples of wireless devices as described herein. For example, the first wireless device 405-a and the second wireless device 405-*b* illustrated in FIG. 4 may include examples of the first wireless device 205-*a* and the second wireless device 205-*b*, respectively, as illustrated in FIG. 2. In this regard, the respective wireless devices 405 may include any types of wireless devices, including, but not limited to, network entities 105, UEs 115, IAB nodes, etc.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the first wireless device 405-*a* may communicate (e.g., transmit, receive), with the second wireless device 405-*b*, a message indicating a polynomial radial codeword configuration associated with OAM communications to be exchanged between the respective devices. In other words, the devices may indicate or negotiate what type of polynomial radial codeword configuration(s) that the devices will use for performing OAM communications with one another.

The polynomial radial codeword configuration may include, but is not limited to, a Laguerre polynomial radial codeword configuration, a Slepian radial codeword configuration, and the like. In general, the polynomial radial codeword configuration may include any polynomial format or structure which wherein the polynomial radial codeword configuration comprises a polynomial configuration (e.g., polynomial radial codeword configuration) which increases (e.g., maximizes) a signal energy associated with OAM signals received at the Rx device (e.g., maximizes OAM signal energy of OAM signals received at the first wireless device 405-*a* and/or the second wireless device 405-*b*).

At 415, the first wireless device 405-*a* may determine a distance between the respective devices. In other words, the first wireless device 405-*a* may be configured to determine the distance 220 between the respective devices (e.g., distance z), as shown and described in FIG. 2. As noted previously herein, there may be multiple methods or implementations that enable the first wireless devices 405-*a* to determine or measure the distance between the devices, including RTT measurements, phase difference measurements across antenna elements in an antenna array at the first wireless device 405-*a*, and the like. Additionally, or alternatively, the first wireless device 405-*a* may determine the distance based on an indication (e.g., explicit indication of the distance) received from the second wireless device 405-*b*, a network entity 105, or other wireless device.

In some cases, as described previously herein, the wireless devices may be configured to perform OAM communications without knowing the distance between the respective devices. As such, in some implementations, the first wireless device 405-*a* may not determine the distance at 415.

At 420, the first wireless device 405-*a* may select a first value of a polynomial term for the polynomial radial codeword configuration. In cases where the first wireless device 405-*a* has previously determined the distance between the respective devices, the first wireless device 405-*a* may select the first value based on the determined distance (e.g., select the first value based on z). In this regard, the first wireless device 405-*a* may select the first value of the polynomial term based on communicating the message indicating the polynomial radial codeword configuration at 410, determining the distance at 415, or both.

For example, in the context of a Laguerre polynomial configuration, the first wireless device 405-*a* may be configured to select a first value for the beam width/waist w(z). In such cases, the polynomial term w(z) may be associated with a beam width value for OAM communications to be transmitted by the first wireless device 405-*a*.

By way of another example, in the context of a Slepian polynomial configuration (e.g., Slepian polynomial radial codeword configuration), the first wireless device 405-*a* may be configured to select a first value for the value c. In such cases, the polynomial term c may be associated with a first radius of a first antenna array at the first wireless device 405-*a* ($R_1$) (e.g., radius of Tx circle(s) 315), a second radius of a second antenna array at the second wireless device 405-*b* ($R_2$) (e.g., radius of Rx circle(s) 320), a wavelength of OAM signals to be transmitted ($\lambda$), the distance between the respective devices (z), or any combination thereof. For example, as described previously herein, the value of c may be determined by $c=2\pi R_1 R_2/\lambda z$.

In this regard, in some aspects, the first wireless device 405-*a* may be configured to select the first value of the polynomial term (e.g., select first value for w(z) or c) based on one or more parameters associated with the first wireless device 405-*a*, the second wireless device 405-*b*, or both. Additional or alternative parameters that may be used to select the first value of the polynomial term may include, but are not limited to, quantities of antenna elements associated with a Tx antenna panel at the first wireless device 405-*a* and/or an Rx antenna panel at the second wireless device 405-*b*, radii associated with the Tx and/or Rx antenna panels at the respective devices (e.g., radii of Tx circle(s) 315 and/or Rx circles 320 illustrated in FIG. 3), or any combination thereof.

In some implementations, the first wireless device 405-*a* may additionally or alternative be configured to select additional parameters/characteristics associated with OAM signals to be transmitted to the second wireless device 405-*b*. Other parameters/characteristics that may be selected/determined by the first wireless device 405-*a* may include, but are not limited to, radial codeword sequences/OAM modes that will be used to generate the OAM signals, Tx power distribution metrics for the respective radial codeword sequences, and the like.

For example, in some cases, the first wireless device 405-*a* may be configured to select a first set of radial codeword sequences (e.g., first set of OAM modes 225) associated with the polynomial radial codeword configuration which will be used to generate and transmit the OAM signals. As described previously herein, each radial codeword sequence (e.g., each OAM mode 225) may be configured to apply a set of weights to the antenna elements/OAM signals along a radial direction of the Tx antenna array at the first wireless device 405-*a*, along a radial direction of the Rx antenna array at the second wireless device 405-*b*, or both. For instance, as shown in FIG. 2, a first radial codeword sequence/first OAM mode 225-*a* may include a set of OAM-formed weights (e.g., $w_{1,1}, w_{1,2}, \ldots, w_{1,n}$) that may be applied to each antenna element of the Tx antenna array 215-*a* to generate OAM signals. Similarly, a second radial codeword sequence/second OAM mode 225-*b* may include a set of OAM-formed weights (e.g., $w_{2,1}, w_{2,2}, \ldots, w_{2,n}$) that may be applied to each antenna element of the Tx antenna array 215-*a* to generate OAM signals.

At 425, the first wireless device 405-*a* may transmit one or more OAM signals to the second wireless device 405-*b*. In particular, the first wireless device 405-*a* may transmit the one or more OAM signals based on (e.g., in accordance with) the first value of the polynomial term for the polynomial radial codeword configuration. In other words, the first wireless device 405-a may generate and/or transmit the OAM signals based on a Laguerre polynomial determined according to the first value for w(z), and/or based on a Slepian polynomial determined according to the first value for c. Moreover, the first wireless device 405-a may transmit the one or more OAM signals in accordance with the set of radial codeword sequences associated with the polynomial radial codeword configuration which were selected at 420.

In this regard, the first wireless device 405-a may transmit the one or more OAM signals at 425 based on communicating the message indicating the polynomial radial codeword configuration at 410, determining the distance (z) between the devices at 415, selecting the first value for the polynomial term (and/or other parameters/characteristics) at 420, or any combination thereof. For example, as described previously herein, the first wireless device 405-a may select a set of radial codeword sequences for the OAM signals at 420, and may generate the OAM signals by applying OAM-formed weights associated with the radial codeword sequences to the antenna elements of the Tx antenna array in the radial direction.

At 430, the second wireless device 405-b may perform measurements on the OAM signals received at 425. In some aspects, the second wireless device 405-b may perform measurements based on the indicated/negotiated polynomial radial codeword configuration (e.g., Laguerre polynomial, Slepian polynomial). The second wireless device 405-b may be configured to measure one or more characteristics of received OAM signals including, but not limited to, an amplitude, a phase, and the like. For example, the second wireless device 405-b may be configured to measure an amplitude and/or phase of OAM signals received at each antenna element of the Rx antenna array at the second wireless device 405-b.

At 435, the second wireless device 405-b may be configured to estimate the first value that was used by the first wireless device 405-a to perform the OAM signals, determine a second (new) value for the polynomial term, or both. In some aspects, the second wireless device 405-b may be configured to estimate the first value and/or determine the second value of the polynomial term based on the amplitude of the OAM signals across the Rx antenna array (e.g., across $r_{2,n}$) of the second wireless device 405-b. In this regard, the second wireless device 405-b may be configured to estimate the first value and/or determine the second value of the polynomial term at 435 based on the indication of the polynomial radial codeword configuration at 410, receiving the OAM signals at 425, performing the measurements at 430, or any combination thereof.

For example, in the context of a Laguerre polynomial radial codeword configuration, the second wireless device 405-b may be configured to estimate the first value of w(z) used to communicate the OAM signals, and may be configured to determine a second/new value of w'(z) based on the received OAM signals. By way of another example, in the context of a Slepian polynomial radial codeword configuration, the second wireless device 405-b may be configured to estimate the first value of c used to communicate the OAM signals, and may be configured to determine a second/new value of c' based on the received OAM signals.

In some aspects, the second wireless device 405-b may determine the second value of the respective polynomial term such that subsequent OAM signals performed using the second value of the polynomial term will exhibit superior performance (e.g., higher SNR, higher CQI, etc.) as compared to the OAM signals performed using the first value of the polynomial term at 425.

At 440, the second wireless device 405-b may transmit a feedback message to the first wireless device 405-a. In some aspects, the feedback message may indicate the second value of the polynomial term (e.g., second value of w(z) or c) which was determined at 435. For example, in some implementations, the feedback message may explicitly indicate the second value of the polynomial term (e.g., explicitly indicate w'(z) or c').

In additional or alternative implementations, the feedback message may indicate the second value by indicating a ratio of the estimated first value and the determined second value. In other words, in some cases, the feedback message may indirectly indicate the second value by indicating a ratio including the second value. For example, in the context of Laguerre polynomials, the feedback message may indicate a ratio of the first w(z) value and the second w'(z) value (e.g., ratio of [w'(z)/w(z)]). By way of another example, in the context of Slepian polynomials, the feedback message may indicate a ratio of the first c value and the second c' value (e.g., ratio of [c'/c]).

In some aspects, the feedback message may indicate additional or alternative parameters/characteristics associated with OAM signals communicated between the respective devices. For example, in some cases, the feedback message may indicate a subset of the radial codeword sequences (e.g., "preferred" radial codeword sequences) that were used to perform the OAM signals at 425. By way of another example, in other cases, the feedback message may indicate a power allocation associated with at least a subset of the set of radial codeword sequences. In other words, the second wireless device 405-b may instruct or request the first wireless device 405-a to adjust a power allocation associated with the radial codeword sequences that will be used to perform subsequent OAM signals.

At 445, the first wireless device 405-a may transmit additional OAM signal(s) to the second wireless device 405-b. The first wireless device 405-a may transmit the additional OAM signals based on the feedback message received at 440. In particular, the first wireless device 405-a may transmit additional OAM signals based on (e.g., in accordance with) the second value of the polynomial term for the polynomial radial codeword configuration, as indicated by the feedback message. In other words, the first wireless device 405-a may generate and/or transmit the OAM signals based on a Laguerre polynomial determined according to the second value for w'(z), and/or based on a Slepian polynomial determined according to the second value for c. Additionally, or alternatively, the first wireless device 405-a may be configured to determine a new value (e.g., third value) for the polynomial term based on the second value and/or ratio indicated via the feedback message.

Moreover, the first wireless device 405-a may transmit the one or more additional OAM signals based on additional information indicated via the feedback message. For example, the first wireless device 405-a may transmit the additional OAM signals in accordance with a subset of radial codeword sequences and/or a power allocation indicated via the feedback message.

In some aspects, the wireless devices 405 may be configured to repeat the steps 425 through 445 for multiple iterations to continue refining the values used to generate OAM signals. For example, as described previously herein, the wireless devices 405 may be configured to repeat step 425 through 445 for a certain (e.g., pre-defined) number of iterations, for a certain time interval (e.g., repeat process for x quantity of slots or seconds), and the like. By way of another example, the wireless devices 405 may be configured to repeat the process of communicating OAM signals and feedback messages to refine the values for the polynomial term until a change in the values of the polynomial term (e.g., changes in values of w or c) indicated in sequential feedback messages are sufficiently small (e.g., repeat until change in w or c is less than some threshold value).

Techniques described herein may enable wireless devices to negotiate radial codewords that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codewords for OAM communications, thereby improving resource utilization, and decreasing power consumption at the respective devices.

Figure 5:
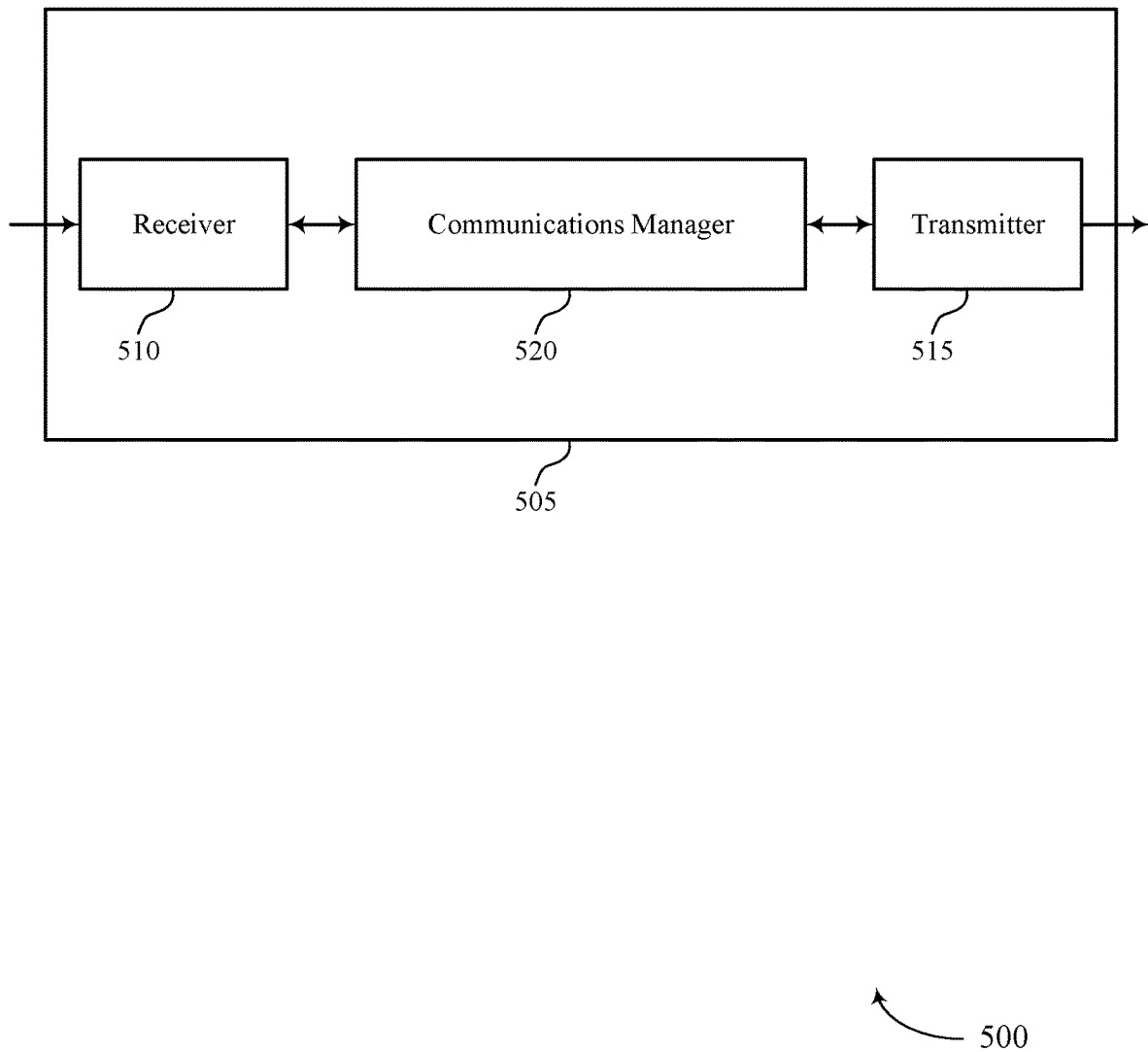
FIGS. 5 and 6 show block diagrams of devices that support techniques for codeword-based radial beamforming for OAM waveforms in accordance with one or more aspects of the present disclosure.

FIG. 5 shows a block diagram 500 of a device 505 that supports techniques for radial codeword-based radial beamforming for OAM waveforms in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for radial codeword-based radial beamforming for OAM waveforms as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 may be configured as or otherwise support a means for transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration. The communications manager 520 may be configured as or otherwise support a means for receiving, from the second wireless device based on the one or more OAM signals, a feedback message indicating a second value of the polynomial term. The communications manager 520 may be configured as or otherwise support a means for transmitting, to the second wireless device, one or more additional OAM signals in accordance with the set of radial codeword sequences and based on the second value.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that enable wireless devices to negotiate radial codewords that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codewords for OAM communications, thereby improving resource utilization, and decreasing power consumption at the respective devices.

Figure 6:
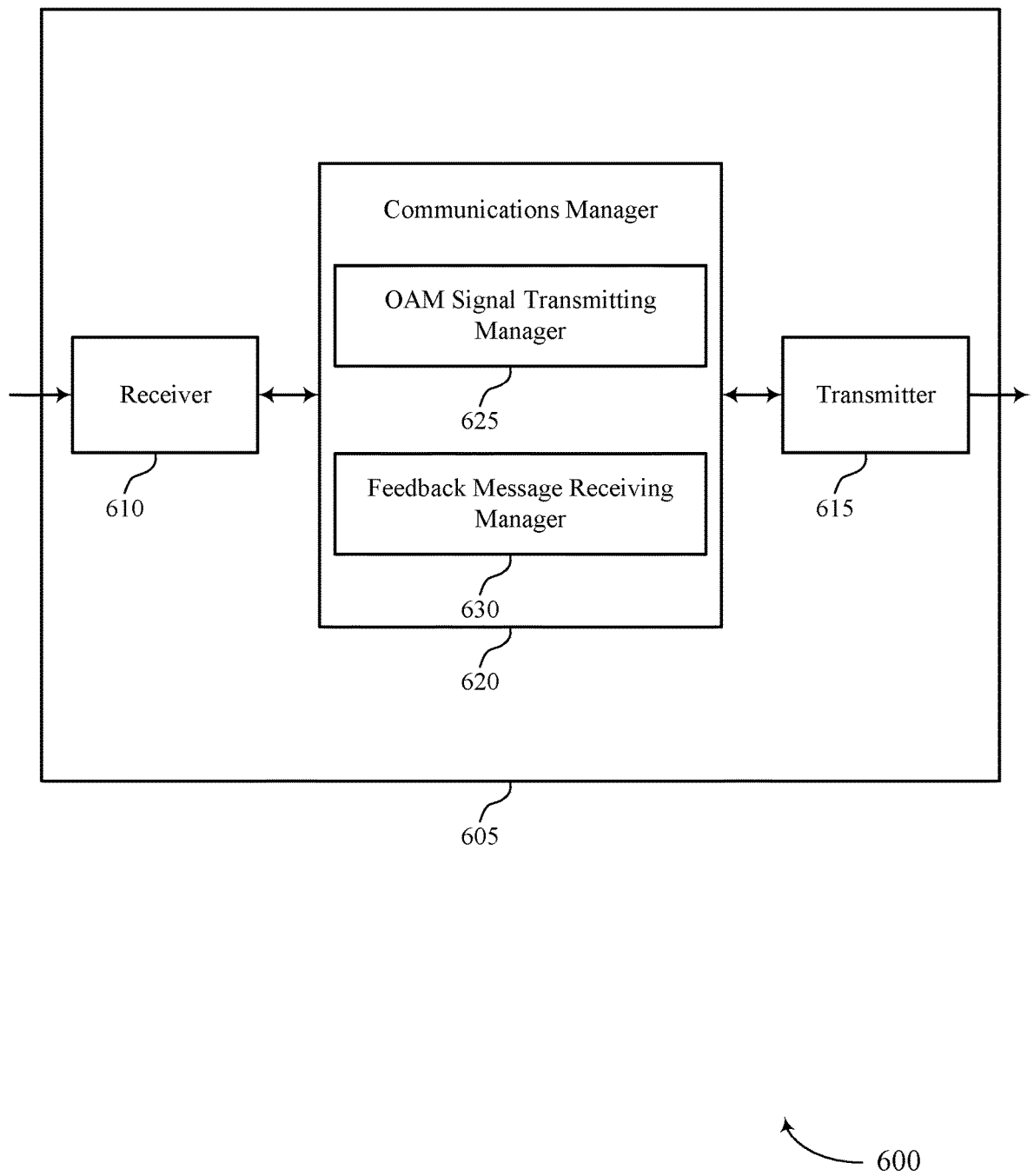

FIG. 6 shows a block diagram 600 of a device 605 that supports techniques for radial codeword-based radial beamforming for OAM waveforms in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for radial codeword-based radial beamforming for OAM waveforms as described herein. For example, the communications manager 620 may include a OAM signal transmitting manager 625 a feedback message receiving manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The OAM signal transmitting manager 625 may be configured as or otherwise support a means for transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration. The feedback message receiving manager 630 may be configured as or otherwise support a means for receiving, from the second wireless device based on the one or more OAM signals, a feedback message indicating a second value of the polynomial term. The OAM signal transmitting manager 625 may be configured as or otherwise support a means for transmitting, to the second wireless device, one or more additional OAM signals in accordance with the set of radial codeword sequences and based on the second value.

Figure 7:
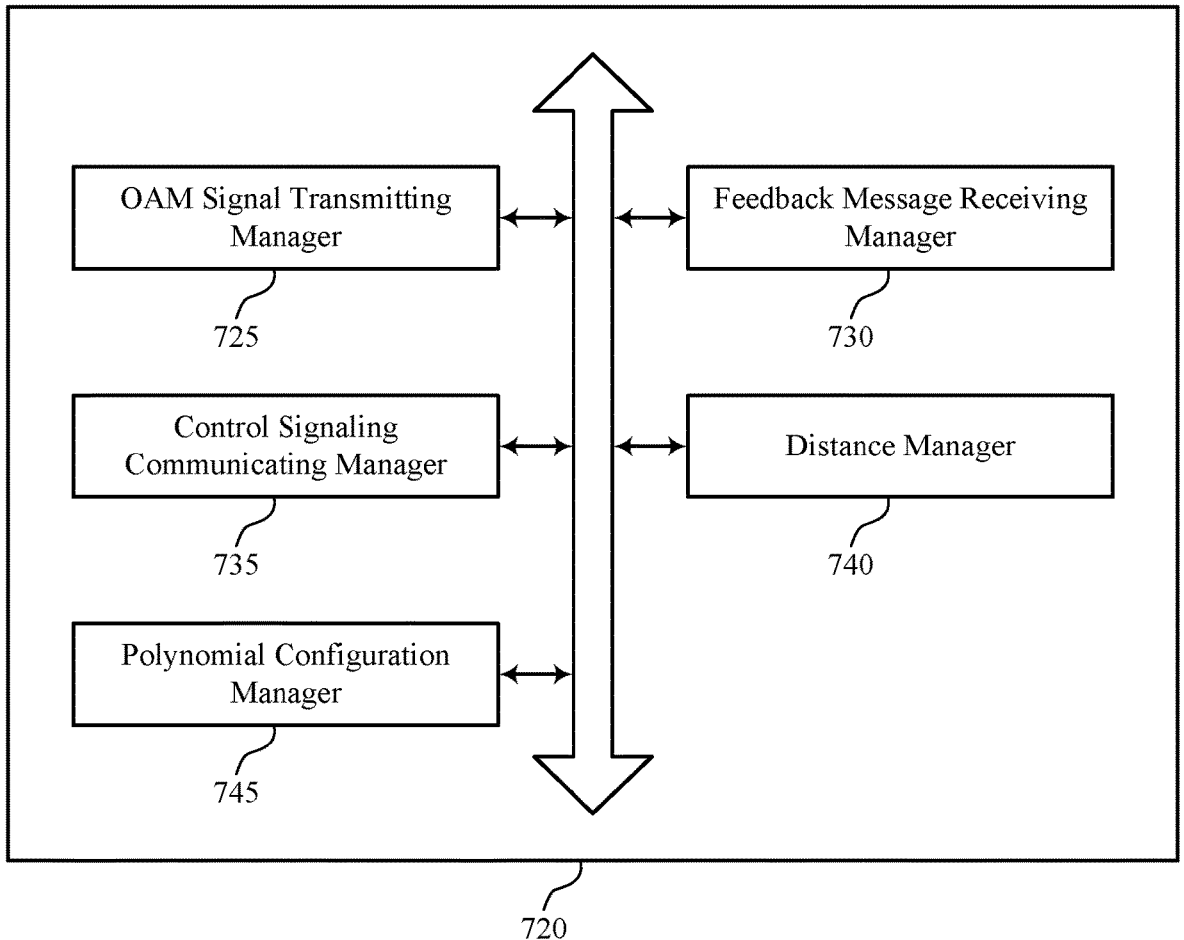
FIG. 7 shows a block diagram of a communications manager that supports techniques for codeword-based radial beamforming for OAM waveforms in accordance with one or more aspects of the present disclosure.

FIG. 7 shows a block diagram 700 of a communications manager 720 that supports techniques for radial codeword-based radial beamforming for OAM waveforms in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for radial codeword-based radial beamforming for OAM waveforms as described herein. For example, the communications manager 720 may include a OAM signal transmitting manager 725, a feedback message receiving manager 730, a control signaling communicating manager 735, a distance manager 740, a polynomial configuration manager 745, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The OAM signal transmitting manager 725 may be configured as or otherwise support a means for transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration. The feedback message receiving manager 730 may be configured as or otherwise support a means for receiving, from the second wireless device based on the one or more OAM signals, a feedback message indicating a second value of the polynomial term. In some examples, the OAM signal transmitting manager 725 may be configured as or otherwise support a means for transmitting, to the second wireless device, one or more additional OAM signals in accordance with the set of radial codeword sequences and based on the second value. In some examples, each radial codeword sequence of the set of radial codeword sequences is configured to apply a set of weights to the one or more OAM signals along a radial direction of an antenna array at the second wireless device.

In some examples, the feedback message receiving manager 730 may be configured as or otherwise support a means for receiving, via the feedback message, a ratio between the first value and the second value of the polynomial term, where transmitting the one or more additional OAM signals is based on the ratio. In some examples, the feedback message receiving manager 730 may be configured as or otherwise support a means for receiving, via the feedback message, an indication of a subset of radial codeword sequences from the set of radial codeword sequences, where the one or more additional OAM signals are transmitted in accordance with the subset of radial codeword sequences.

In some examples, the feedback message receiving manager 730 may be configured as or otherwise support a means for receiving, via the feedback message, a power allocation associated with at least a subset of the set of radial codeword sequences, where the one or more additional OAM signals are transmitted based on the power allocation.

In some examples, the control signaling communicating manager 735 may be configured as or otherwise support a means for communicating, with the second wireless device, a message indicating the polynomial radial codeword configuration, where transmitting the one or more OAM signals, receiving the feedback message, or both, is based on the message.

In some examples, the distance manager 740 may be configured as or otherwise support a means for determining a distance between the first wireless device and the second wireless device, where the first value of the polynomial term is based on the distance.

In some examples, the first value, the second value, or both, are based on a set of parameters associated with a first antenna panel at the first wireless device, a second antenna panel at the second wireless device, or both. In some examples, the set of parameters include a first quantity of antenna elements associated with the first antenna panel, a second quantity of antenna elements associated with the second antenna panel, a first radius associated with a first set of multiple antenna elements of the first antenna panel, a second radius associated with a second set of multiple antenna elements of the second antenna panel, or any combination thereof.

In some examples, the feedback message receiving manager 730 may be configured as or otherwise support a means for receiving, from the second wireless device based on the one or more additional OAM signals, a second feedback message indicating a third value of the polynomial term. In some examples, the OAM signal transmitting manager 725 may be configured as or otherwise support a means for transmitting, to the second wireless device, a third set of OAM signals in accordance with the set of radial codeword sequences and based on the third value.

In some examples, the polynomial configuration manager 745 may be configured as or otherwise support a means for determining that a difference between the first value and the second value is less than a threshold. In some examples, the OAM signal transmitting manager 725 may be configured as or otherwise support a means for transmitting the one or more additional OAM signals based on the second value throughout a time interval based on determining that the difference satisfies the threshold.

In some examples, the polynomial radial codeword configuration includes a Laguerre polynomial radial codeword configuration or a Slepian polynomial configuration. In some examples, the polynomial radial codeword configuration includes a polynomial radial codeword configuration which maximizes a signal energy received at the second wireless device, the signal energy associated with the one or more OAM signals, the one or more additional OAM signals, or both.

In some examples, the polynomial term is associated with a beam width value associated with OAM signals transmitted by the first wireless device. In some examples, the polynomial term is associated with a first radius of a first antenna array at the first wireless device, a second radius of a second antenna array at the second wireless device, a wavelength of the one or more OAM signals, a distance between the first wireless device and the second wireless device, or any combination thereof.

Figure 8:
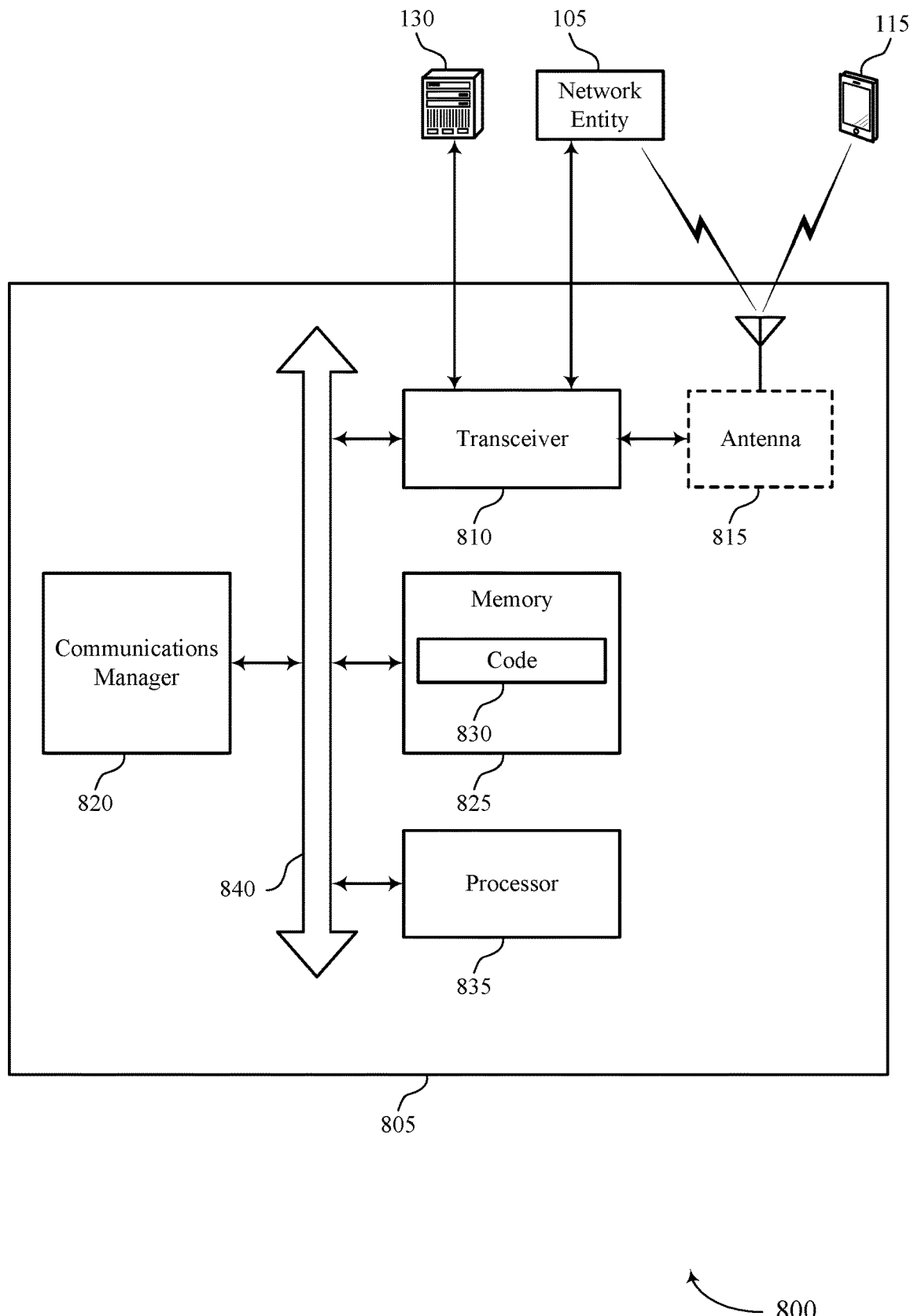
FIG. 8 shows a diagram of a system including a device that supports techniques for codeword-based radial beamforming for OAM waveforms in accordance with one or more aspects of the present disclosure.

FIG. 8 shows a diagram of a system 800 including a device 805 that supports techniques for radial codeword-based radial beamforming for OAM waveforms in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for radial codeword-based radial beamforming for OAM waveforms). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

For example, the communications manager 820 may be configured as or otherwise support a means for transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration. The communications manager 820 may be configured as or otherwise support a means for receiving, from the second wireless device based on the one or more OAM signals, a feedback message indicating a second value of the polynomial term. The communications manager 820 may be configured as or otherwise support a means for transmitting, to the second wireless device, one or more additional OAM signals in accordance with the set of radial codeword sequences and based on the second value.

By including or configuring the communications manager 820 in accordance with examples as described herein, the device 805 may support techniques that enable wireless devices to negotiate radial codewords that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codewords for OAM communications, thereby improving resource utilization, and decreasing power consumption at the respective devices.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of techniques for radial codeword-based radial beamforming for OAM waveforms as described herein, or the processor 835 and the memory 825 may be otherwise configured to perform or support such operations.

Figure 9:
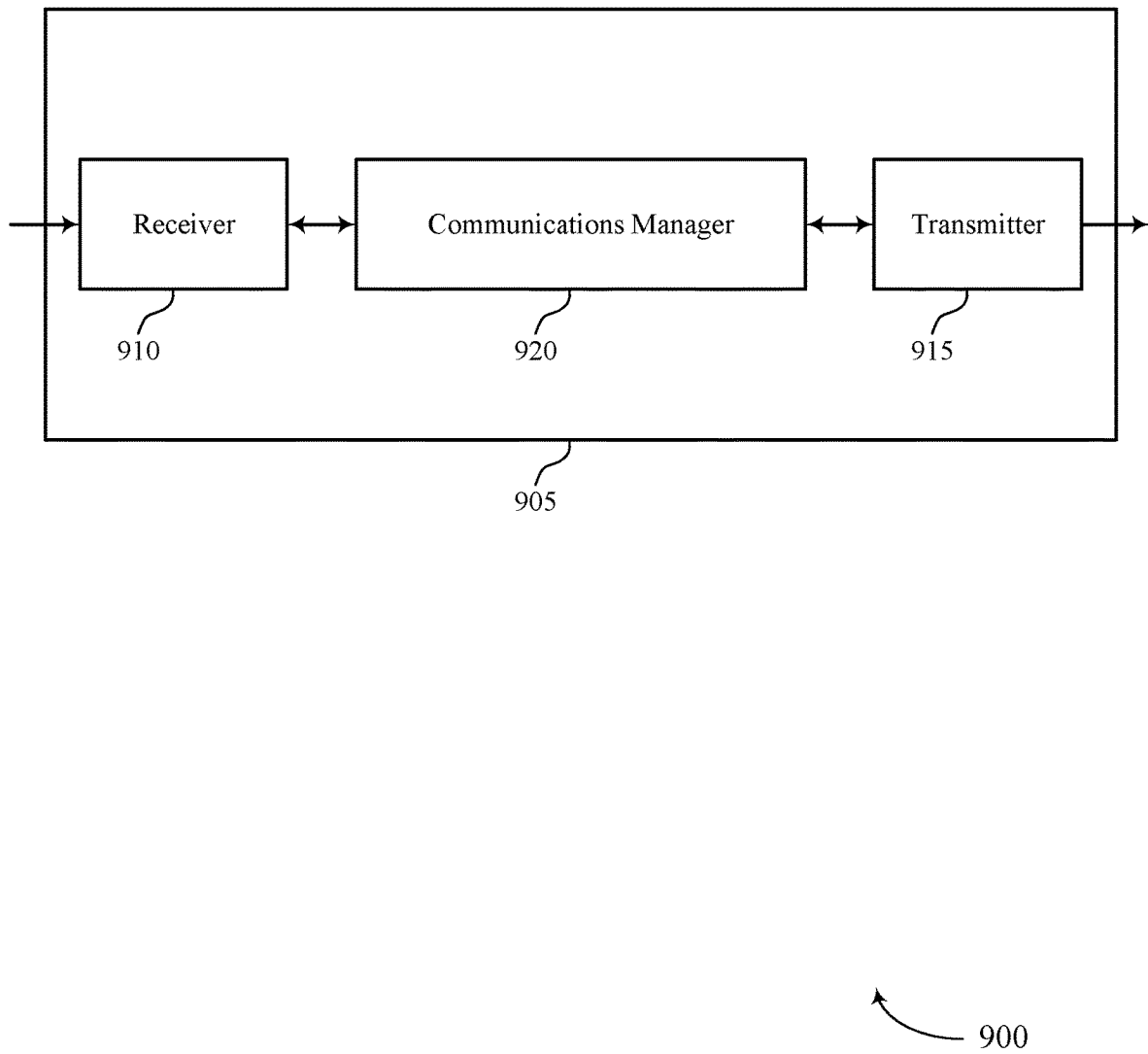
FIGS. 9 and 10 show block diagrams of devices that support techniques for codeword-based radial beamforming for OAM waveforms in accordance with one or more aspects of the present disclosure.

FIG. 9 shows a block diagram 900 of a device 905 that supports techniques for radial codeword-based radial beamforming for OAM waveforms in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for radial codeword-based radial beamforming for OAM waveforms). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for radial codeword-based radial beamforming for OAM waveforms). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for radial codeword-based radial beamforming for OAM waveforms as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

For example, the communications manager 920 may be configured as or otherwise support a means for receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration. The communications manager 920 may be configured as or otherwise support a means for transmitting, to the first wireless device based on the one or more OAM signals, a feedback message indicating a second value of the polynomial term. The communications manager 920 may be configured as or otherwise support a means for receiving, from the first wireless device, one or more additional OAM signals in accordance with the set of radial codeword sequences and based on the second value.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that enable wireless devices to negotiate radial codewords that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codewords for OAM communications, thereby improving resource utilization, and decreasing power consumption at the respective devices.

Figure 10:
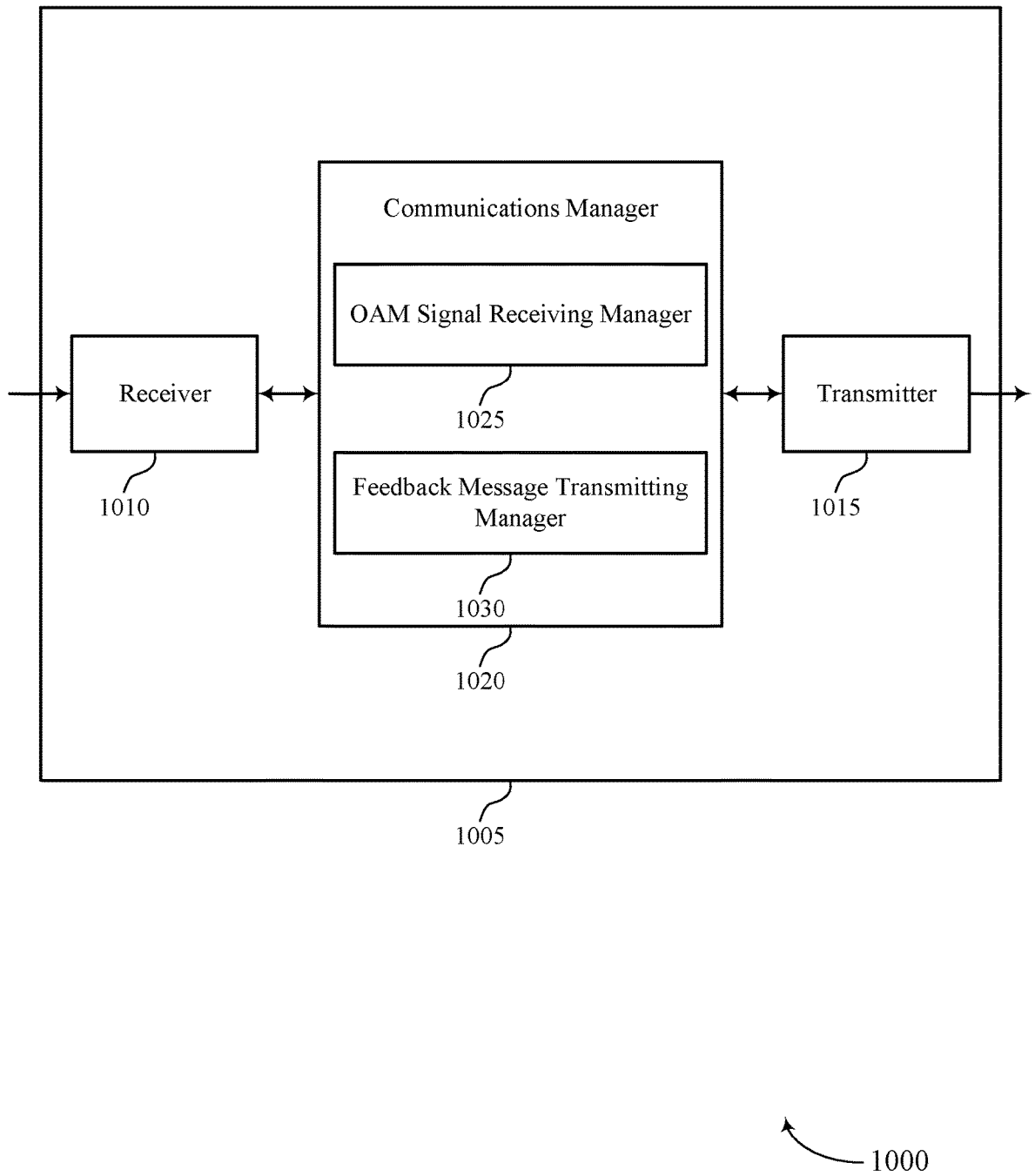

FIG. 10 shows a block diagram 1000 of a device 1005 that supports techniques for radial codeword-based radial beamforming for OAM waveforms in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for radial codeword-based radial beamforming for OAM waveforms). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for radial codeword-based radial beamforming for OAM waveforms). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for radial codeword-based radial beamforming for OAM waveforms as described herein. For example, the communications manager 1020 may include a OAM signal receiving manager 1025 a feedback message transmitting manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The OAM signal receiving manager 1025 may be configured as or otherwise support a means for receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration. The feedback message transmitting manager 1030 may be configured as or otherwise support a means for transmitting, to the first wireless device based on the one or more OAM signals, a feedback message indicating a second value of the polynomial term. The OAM signal receiving manager 1025 may be configured as or otherwise support a means for receiving, from the first wireless device, one or more additional OAM signals in accordance with the set of radial codeword sequences and based on the second value.

Figure 11:
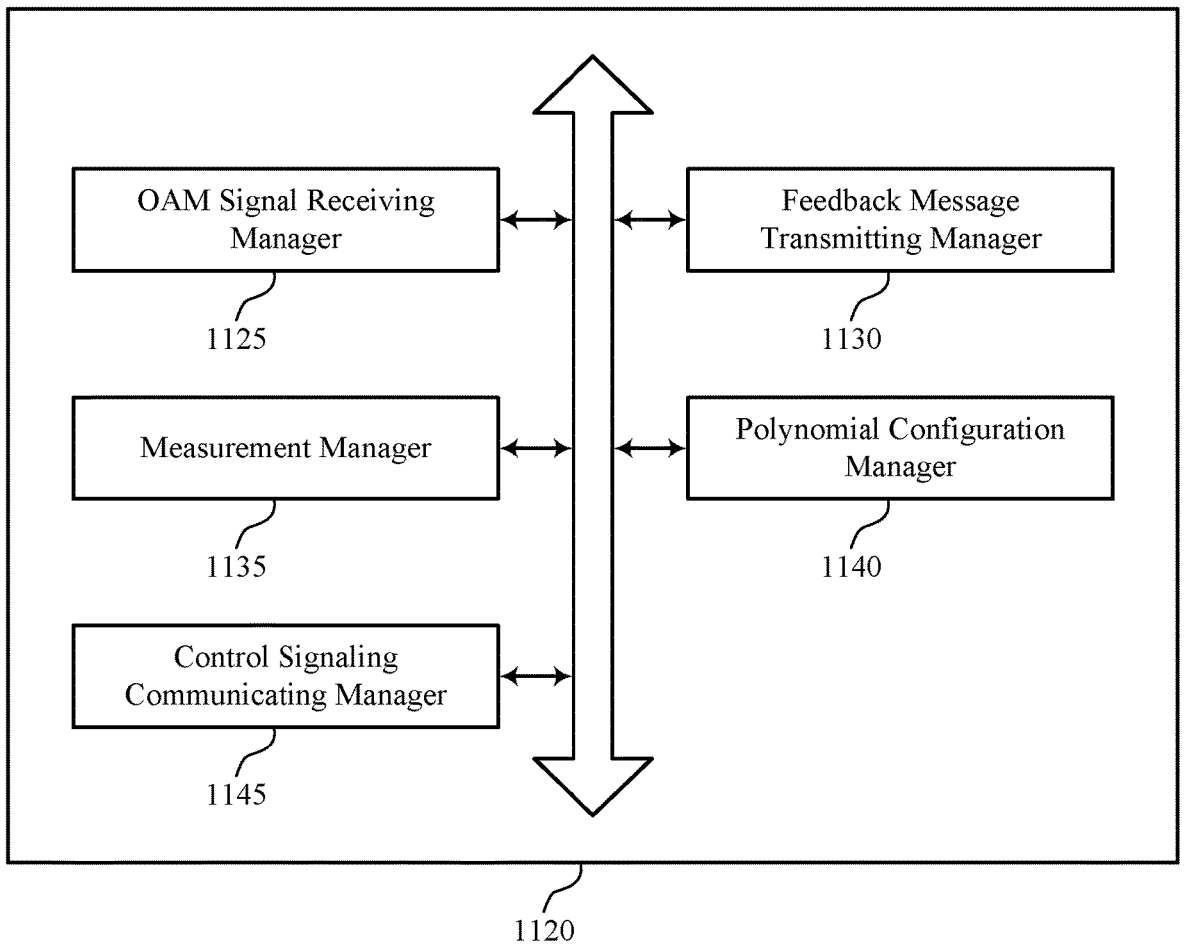
FIG. 11 shows a block diagram of a communications manager that supports techniques for codeword-based radial beamforming for OAM waveforms in accordance with one or more aspects of the present disclosure.

FIG. 11 shows a block diagram 1100 of a communications manager 1120 that supports techniques for radial codeword-based radial beamforming for OAM waveforms in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for radial codeword-based radial beamforming for OAM waveforms as described herein. For example, the communications manager 1120 may include a OAM signal receiving manager 1125, a feedback message transmitting manager 1130, a measurement manager 1135, a polynomial configuration manager 1140, a control signaling communicating manager 1145, or any combination thereof. Each of these components may communicate, directly or indirectly, with one another (e.g., via one or more buses).

The OAM signal receiving manager 1125 may be configured as or otherwise support a means for receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration. The feedback message transmitting manager 1130 may be configured as or otherwise support a means for transmitting, to the first wireless device based on the one or more OAM signals, a feedback message indicating a second value of the polynomial term. In some examples, the OAM signal receiving manager 1125 may be configured as or otherwise support a means for receiving, from the first wireless device, one or more additional OAM signals in accordance with the set of radial codeword sequences and based on the second value.

In some examples, the measurement manager 1135 may be configured as or otherwise support a means for performing measurements on the one or more OAM signals. In some examples, the polynomial configuration manager 1140 may be configured as or otherwise support a means for determining the second value of the polynomial term based on the measurements, where transmitting the feedback message is based on determining the second value.

In some examples, the feedback message transmitting manager 1130 may be configured as or otherwise support a means for transmitting, via the feedback message, a ratio between the first value and the second value of the polynomial term, where receiving the one or more additional OAM signals is based on the ratio. In some examples, the feedback message transmitting manager 1130 may be configured as or otherwise support a means for transmitting, via the feedback message, an indication of a subset of radial codeword sequences from the set of radial codeword sequences, where the one or more additional OAM signals are received in accordance with the subset of radial codeword sequences.

In some examples, the feedback message transmitting manager 1130 may be configured as or otherwise support a means for transmitting, via the feedback message, a power allocation associated with at least a subset of the set of radial codeword sequences, where the one or more additional OAM signals are received based on the power allocation.

In some examples, the control signaling communicating manager 1145 may be configured as or otherwise support a means for communicating, with the second wireless device, a message indicating the polynomial radial codeword configuration, where receiving the one or more OAM signals, transmitting the feedback message, or both, is based on the message.

In some examples, the first value of the polynomial term is based on a distance. In some examples, the first value, the second value, or both, are based on a set of parameters associated with a first antenna panel at the first wireless device, a second antenna panel at the second wireless device, or both.

In some examples, the set of parameters include a first quantity of antenna elements associated with the first antenna panel, a second quantity of antenna elements associated with the second antenna panel, a first radius associated with a first set of multiple antenna elements of the first antenna panel, a second radius associated with a second set of multiple antenna elements of the second antenna panel, or any combination thereof.

In some examples, the feedback message transmitting manager 1130 may be configured as or otherwise support a means for transmitting, to the first wireless device based on the one or more additional OAM signals, a second feedback message indicating a third value of the polynomial term. In some examples, the OAM signal receiving manager 1125 may be configured as or otherwise support a means for receiving, from the first wireless device, a third set of OAM signals in accordance with the set of radial codeword sequences and based on the third value.

In some examples, the OAM signal receiving manager 1125 may be configured as or otherwise support a means for receiving the one or more additional OAM signals based on the second value throughout a time interval based on a difference between the first value and the second value satisfying a threshold.

In some examples, the polynomial radial codeword configuration includes a Laguerre polynomial configuration or a Slepian polynomial configuration. In some examples, the polynomial term is associated with a beam width value associated with OAM signals transmitted by the first wireless device. In some examples, the polynomial term is associated with a first radius of a first antenna array at the first wireless device, a second radius of a second antenna array at the second wireless device, a wavelength of the one or more OAM signals, a distance between the first wireless device and the second wireless device, or any combination thereof.

Figure 12:
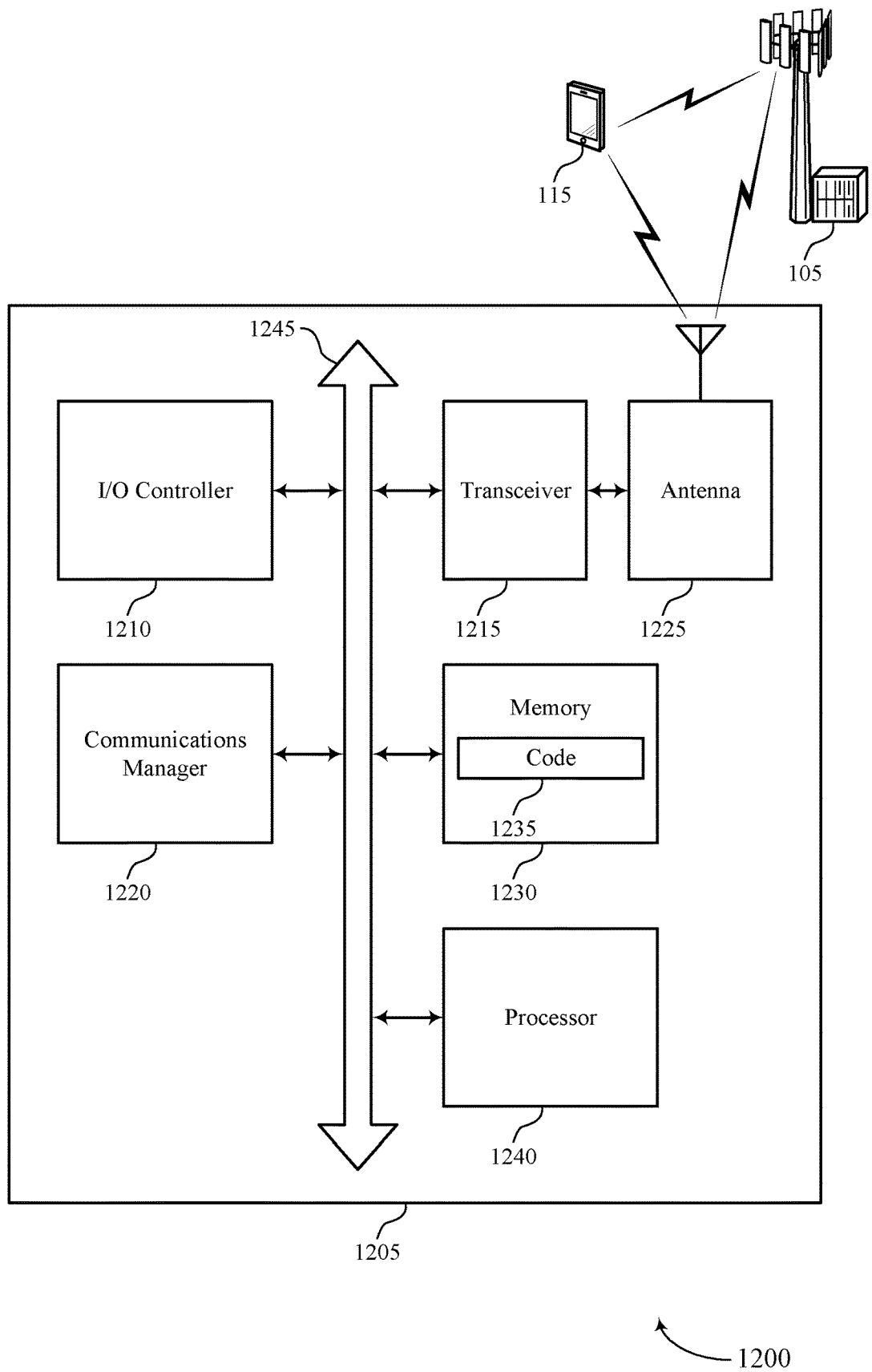
FIG. 12 shows a diagram of a system including a device that supports techniques for codeword-based radial beamforming for OAM waveforms in accordance with one or more aspects of the present disclosure.

FIG. 12 shows a diagram of a system 1200 including a device 1205 that supports techniques for radial codeword-based radial beamforming for OAM waveforms in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for radial codeword-based radial beamforming for OAM waveforms). For example, the device 1205 or a component of the device 1205 may include a processor 1240 and memory 1230 coupled with or to the processor 1240, the processor 1240 and memory 1230 configured to perform various functions described herein.

For example, the communications manager 1220 may be configured as or otherwise support a means for receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration. The communications manager 1220 may be configured as or otherwise support a means for transmitting, to the first wireless device based on the one or more OAM signals, a feedback message indicating a second value of the polynomial term. The communications manager 1220 may be configured as or otherwise support a means for receiving, from the first wireless device, one or more additional OAM signals in accordance with the set of radial codeword sequences and based on the second value.

By including or configuring the communications manager 1220 in accordance with examples as described herein, the device 1205 may support techniques that enable wireless devices to negotiate radial codewords that are used to perform OAM communications. In particular, techniques described herein may enable Tx and Rx devices to negotiate or indicate polynomial radial codeword configurations that are to be used for OAM communications between the respective devices, and exchange signaling used to determine values for polynomial terms associated with the indicated/negotiated polynomial radial codeword configuration. By limiting radial codeword sequences to known/defined polynomial radial codeword configurations, techniques described herein may simplify the type and size of feedback exchanged between devices to determine radial codeword sequences for OAM communications. As such, techniques described herein may reduce a size and or frequency of feedback messages exchanged between devices used to determine radial codewords for OAM communications, thereby improving resource utilization, and decreasing power consumption at the respective devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for radial codeword-based radial beamforming for OAM waveforms as described herein, or the processor 1240 and the memory 1230 may be otherwise configured to perform or support such operations.

Figure 13:
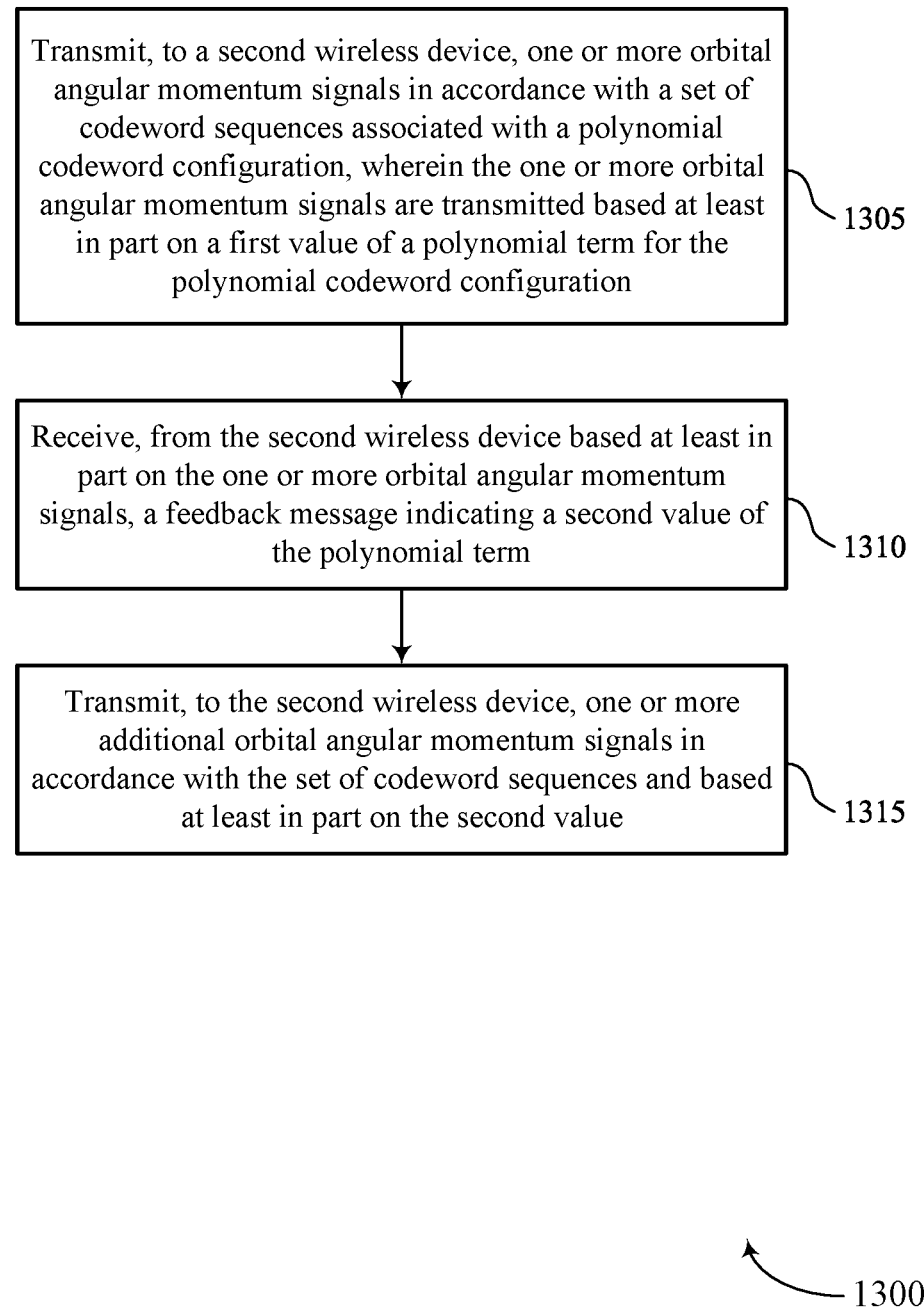
FIGS. 13 and 14 show flowcharts illustrating methods that support techniques for codeword-based radial beamforming for OAM waveforms in accordance with one or more aspects of the present disclosure.

FIG. 13 shows a flowchart illustrating a method 1300 that supports techniques for radial codeword-based radial beamforming for OAM waveforms in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include transmitting, to a second wireless device, one or more OAM signals in accordance with a set of radial codeword sequences associated with a polynomial radial codeword configuration, where the one or more OAM signals are transmitted based on a first value of a polynomial term for the polynomial radial codeword configuration. The operations of 1305 may be performed in accordance with examples as disclosed herein. In some examples, aspects of the operations of 1305 may be performed by a OAM signal transmitting manager 725 as described with reference to FIG. 7.

At 1310, the method may include receiving, from the second wireless device based on the one or more OAM signals, a feedback message indicating a second value of the polynomial term. The operations of 1310 may be performed in accordance with examples as disclosed herein. In some examples, aspects of the operations of 1310 may be performed by a feedback message receiving manager 730 as described with reference to FIG. 7.

At 1315, the method may include transmitting, to the second wireless device, one or more additional OAM signals in accordance with the set of radial codeword sequences and based on the second value. The operations of 1315 may be performed in accordance with examples as disclosed herein. In some examples, aspects of the operations of 1315 may be performed by a OAM signal transmitting manager 725 as described with reference to FIG. 7.

Figure 14:
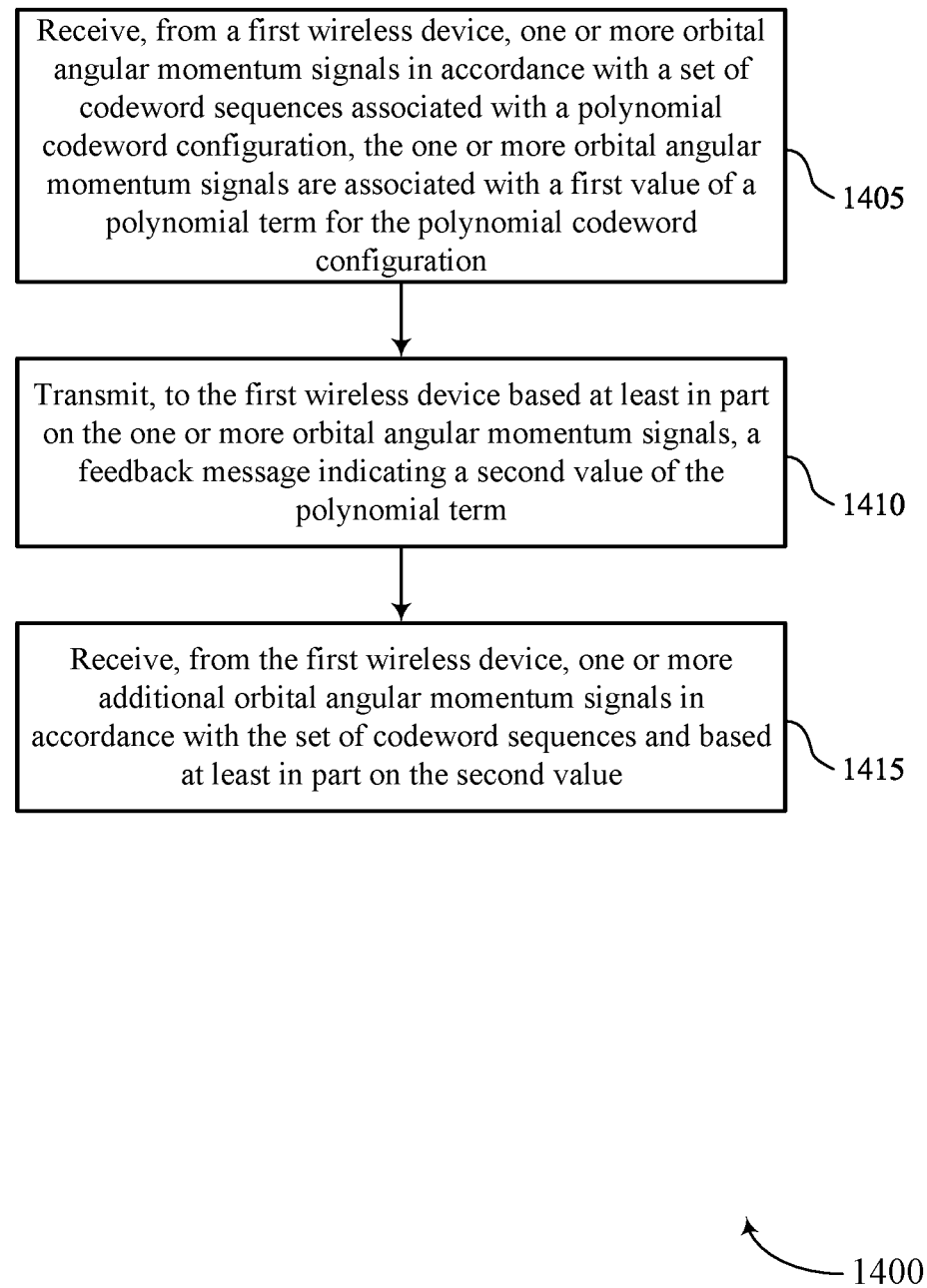

FIG. 14 shows a flowchart illustrating a method 1400 that supports techniques for radial codeword-based radial beamforming for OAM waveforms in accordance with one or more aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1405, the method may include receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration. The operations of 1405 may be performed in accordance with examples as disclosed herein. In some examples, aspects of the operations of 1405 may be performed by a OAM signal receiving manager 1125 as described with reference to FIG. 11.

At 1410, the method may include transmitting, to the first wireless device based on the one or more OAM signals, a feedback message indicating a second value of the polynomial term. The operations of 1410 may be performed in accordance with examples as disclosed herein. In some examples, aspects of the operations of 1410 may be performed by a feedback message transmitting manager 1130 as described with reference to FIG. 11.

At 1415, the method may include receiving, from the first wireless device, one or more additional OAM signals in accordance with the set of radial codeword sequences and based on the second value. The operations of 1415 may be performed in accordance with examples as disclosed herein. In some examples, aspects of the operations of 1415 may be performed by a OAM signal receiving manager 1125 as described with reference to FIG. 11.

The following provides an overview of aspects of the present disclosure:

Aspect 1: A method for wireless communication at a first wireless device, comprising: transmitting, to a second wireless device, one or more OAM signals in accordance with a set of radial codeword sequences associated with a polynomial radial codeword configuration, wherein the one or more OAM signals are transmitted based at least in part on a first value of a polynomial term for the polynomial radial codeword configuration; receiving, from the second wireless device based at least in part on the one or more OAM signals, a feedback message indicating a second value of the polynomial term; and transmitting, to the second wireless device, one or more additional OAM signals in accordance with the set of radial codeword sequences and based at least in part on the second value.

Aspect 2: The method of aspect 1, wherein each radial codeword sequence of the set of radial codeword sequences is configured to apply a set of weights to the one or more OAM signals along a radial direction of an antenna array at the second wireless device.

Aspect 3: The method of any of aspects 1 through 2, further comprising: receiving, via the feedback message, a ratio between the first value and the second value of the polynomial term, wherein transmitting the one or more additional OAM signals is based at least in part on the ratio.

Aspect 4: The method of any of aspects 1 through 3, further comprising: receiving, via the feedback message, an indication of a subset of radial codeword sequences from the set of radial codeword sequences, wherein the one or more additional OAM signals are transmitted in accordance with the subset of radial codeword sequences.

Aspect 5: The method of any of aspects 1 through 4, further comprising: receiving, via the feedback message, a power allocation associated with at least a subset of the set of radial codeword sequences, wherein the one or more additional OAM signals are transmitted based at least in part on the power allocation.

Aspect 6: The method of any of aspects 1 through 5, further comprising: communicating, with the second wireless device, a message indicating the polynomial radial codeword configuration, wherein transmitting the one or more OAM signals, receiving the feedback message, or both, is based at least in part on the message.

Aspect 7: The method of any of aspects 1 through 6, further comprising: determining a distance between the first wireless device and the second wireless device, wherein the first value of the polynomial term is based at least in part on the distance.

Aspect 8: The method of any of aspects 1 through 7, wherein the first value, the second value, or both, are based at least in part on a set of parameters associated with a first antenna panel at the first wireless device, a second antenna panel at the second wireless device, or both.

Aspect 9: The method of aspect 8, wherein the set of parameters comprise a first quantity of antenna elements associated with the first antenna panel, a second quantity of antenna elements associated with the second antenna panel, a first radius associated with a first plurality of antenna elements of the first antenna panel, a second radius associated with a second plurality of antenna elements of the second antenna panel, or any combination thereof.

Aspect 10: The method of any of aspects 1 through 9, further comprising: receiving, from the second wireless device based at least in part on the one or more additional OAM signals, a second feedback message indicating a third value of the polynomial term; and transmitting, to the second wireless device, a third set of OAM signals in accordance with the set of radial codeword sequences and based at least in part on the third value.

Aspect 11: The method of any of aspects 1 through 10, further comprising: determining that a difference between the first value and the second value is less than a threshold; and transmitting the one or more additional OAM signals based at least in part on the second value throughout a time interval based at least in part on determining that the difference satisfies the threshold.

Aspect 12: The method of any of aspects 1 through 11, wherein the polynomial radial codeword configuration comprises a Laguerre polynomial configuration or a Slepian polynomial configuration.

Aspect 13: The method of any of aspects 1 through 12, wherein the polynomial radial codeword configuration comprises a polynomial configuration which maximizes a signal energy received at the second wireless device, the signal energy associated with the one or more OAM signals, the one or more additional OAM signals, or both.

Aspect 14: The method of any of aspects 1 through 13, wherein the polynomial term is associated with a beam width value associated with OAM signals transmitted by the first wireless device.

Aspect 15: The method of any of aspects 1 through 14, wherein the polynomial term is associated with a first radius of a first antenna array at the first wireless device, a second radius of a second antenna array at the second wireless device, a wavelength of the one or more OAM signals, a distance between the first wireless device and the second wireless device, or any combination thereof.

Aspect 16: A method for wireless communication at a second wireless device, comprising: receiving, from a first wireless device, one or more OAM signals in accordance with a set of radial codeword sequences associated with a polynomial radial codeword configuration, the one or more OAM signals are associated with a first value of a polynomial term for the polynomial radial codeword configuration; transmitting, to the first wireless device based at least in part on the one or more OAM signals, a feedback message indicating a second value of the polynomial term; and receiving, from the first wireless device, one or more additional OAM signals in accordance with the set of radial codeword sequences and based at least in part on the second value.

Aspect 17: The method of aspect 16, further comprising: performing measurements on the one or more OAM signals; and determining the second value of the polynomial term based at least in part on the measurements, wherein transmitting the feedback message is based at least in part on determining the second value.

Aspect 18: The method of any of aspects 16 through 17, further comprising: transmitting, via the feedback message, a ratio between the first value and the second value of the polynomial term, wherein receiving the one or more additional OAM signals is based at least in part on the ratio.

Aspect 19: The method of any of aspects 16 through 18, further comprising: transmitting, via the feedback message, an indication of a subset of radial codeword sequences from the set of radial codeword sequences, wherein the one or more additional OAM signals are received in accordance with the subset of radial codeword sequences.

Aspect 20: The method of any of aspects 16 through 19, further comprising: transmitting, via the feedback message, a power allocation associated with at least a subset of the set of radial codeword sequences, wherein the one or more additional OAM signals are received based at least in part on the power allocation.

Aspect 21: The method of any of aspects 16 through 20, further comprising: communicating, with the second wireless device, a message indicating the polynomial radial codeword configuration, wherein receiving the one or more OAM signals, transmitting the feedback message, or both, is based at least in part on the message.

Aspect 22: The method of any of aspects 16 through 21, wherein the first value of the polynomial term is based at least in part on a distance.

Aspect 23: The method of any of aspects 16 through 22, wherein the first value, the second value, or both, are based at least in part on a set of parameters associated with a first antenna panel at the first wireless device, a second antenna panel at the second wireless device, or both.

Aspect 24: The method of aspect 23, wherein the set of parameters comprise a first quantity of antenna elements associated with the first antenna panel, a second quantity of antenna elements associated with the second antenna panel, a first radius associated with a first plurality of antenna elements of the first antenna panel, a second radius associated with a second plurality of antenna elements of the second antenna panel, or any combination thereof.

Aspect 25: The method of any of aspects 16 through 24, further comprising: transmitting, to the first wireless device based at least in part on the one or more additional OAM signals, a second feedback message indicating a third value of the polynomial term; and receiving, from the first wireless device, a third set of OAM signals in accordance with the set of radial codeword sequences and based at least in part on the third value.

Aspect 26: The method of any of aspects 16 through 25, further comprising: receiving the one or more additional OAM signals based at least in part on the second value throughout a time interval based at least in part on a difference between the first value and the second value satisfying a threshold.

Aspect 27: The method of any of aspects 16 through 26, wherein the polynomial radial codeword configuration comprises a Laguerre polynomial configuration or a Slepian polynomial configuration.

Aspect 28: The method of any of aspects 16 through 27, wherein the polynomial term is associated with a beam width value associated with OAM signals transmitted by the first wireless device.

Aspect 29: An apparatus for wireless communication at a first wireless device, comprising a processor; memory coupled with the processor; and instructions stored in the memory and executable by the processor to cause the apparatus to perform a method of any of aspects 1 through 15.

Aspect 30: An apparatus for wireless communication at a first wireless device, comprising at least one means for performing a method of any of aspects 1 through 15.

Aspect 31: A non-transitory computer-readable medium storing code for wireless communication at a first wireless device, the code comprising instructions executable by a processor to perform a method of any of aspects 1 through 15.

Aspect 32: An apparatus for wireless communication at a second wireless device, comprising a processor; memory coupled with the processor; and instructions stored in the memory and executable by the processor to cause the apparatus to perform a method of any of aspects 16 through 28.

Aspect 33: An apparatus for wireless communication at a second wireless device, comprising at least one means for performing a method of any of aspects 16 through 28.

Aspect 34: A non-transitory computer-readable medium storing code for wireless communication at a second wireless device, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   one or more processors;
   one or more memories coupled with the one or more processors; and
   instructions stored in the one or more memories and executable by the one or more processors to cause the apparatus to:
      transmit, to a second wireless device, one or more orbital angular momentum signals in accordance with a set of radial codeword sequences associated with a polynomial radial codeword configuration, wherein the one or more orbital angular momentum signals are transmitted based at least in part on a first value of a polynomial term for the polynomial radial codeword configuration;
      receive, from the second wireless device based at least in part on the one or more orbital angular momentum signals, a feedback message indicating a second value of the polynomial term; and
      transmit, to the second wireless device, one or more additional orbital angular momentum signals in accordance with the set of radial codeword sequences and based at least in part on the second value.

2. The apparatus of claim 1, wherein each radial codeword sequence of the set of radial codeword sequences is configured to apply a set of weights to the one or more orbital angular momentum signals along a radial direction of an antenna array at the second wireless device.

3. The apparatus of claim 1, wherein the instructions are further executable by the one or more processors to cause the apparatus to:

receive, via the feedback message, a ratio between the first value and the second value of the polynomial term, wherein transmitting the one or more additional orbital angular momentum signals is based at least in part on the ratio.

4. The apparatus of claim 1, wherein the instructions are further executable by the one or more processors to cause the apparatus to:
receive, via the feedback message, an indication of a subset of radial codeword sequences from the set of radial codeword sequences, wherein the one or more additional orbital angular momentum signals are transmitted in accordance with the subset of radial codeword sequences.

5. The apparatus of claim 1, wherein the instructions are further executable by the one or more processors to cause the apparatus to:
receive, via the feedback message, a power allocation associated with at least a subset of the set of radial codeword sequences, wherein the one or more additional orbital angular momentum signals are transmitted based at least in part on the power allocation.

6. The apparatus of claim 1, wherein the instructions are further executable by the one or more processors to cause the apparatus to:
communicate, with the second wireless device, a message indicating the polynomial radial codeword configuration, wherein transmitting the one or more orbital angular momentum signals, receiving the feedback message, or both, is based at least in part on the message.

7. The apparatus of claim 1, wherein the instructions are further executable by the one or more processors to cause the apparatus to:
determine a distance between the first wireless device and the second wireless device, wherein the first value of the polynomial term is based at least in part on the distance.

8. The apparatus of claim 1, wherein the first value, the second value, or both, are based at least in part on a set of parameters associated with a first antenna panel at the first wireless device, a second antenna panel at the second wireless device, or both.

9. The apparatus of claim 8, wherein the set of parameters comprise a first quantity of antenna elements associated with the first antenna panel, a second quantity of antenna elements associated with the second antenna panel, a first radius associated with a first plurality of antenna elements of the first antenna panel, a second radius associated with a second plurality of antenna elements of the second antenna panel, or any combination thereof.

10. The apparatus of claim 1, wherein the instructions are further executable by the one or more processors to cause the apparatus to:
receive, from the second wireless device based at least in part on the one or more additional orbital angular momentum signals, a second feedback message indicating a third value of the polynomial term; and
transmit, to the second wireless device, a third set of orbital angular momentum signals in accordance with the set of radial codeword sequences and based at least in part on the third value.

11. The apparatus of claim 1, wherein the instructions are further executable by the one or more processors to cause the apparatus to:
determine that a difference between the first value and the second value is less than a threshold; and
transmit the one or more additional orbital angular momentum signals based at least in part on the second value throughout a time interval based at least in part on determining that the difference satisfies the threshold.

12. The apparatus of claim 1, wherein the polynomial radial codeword configuration comprises a Laguerre polynomial configuration or a Slepian polynomial configuration.

13. The apparatus of claim 1, wherein the polynomial radial codeword configuration comprises a polynomial configuration which maximizes a signal energy received at the second wireless device, the signal energy associated with the one or more orbital angular momentum signals, the one or more additional orbital angular momentum signals, or both.

14. The apparatus of claim 1, wherein the polynomial term is associated with a beam width value associated with orbital angular momentum signals transmitted by the first wireless device.

15. The apparatus of claim 1, wherein the polynomial term is associated with a first radius of a first antenna array at the first wireless device, a second radius of a second antenna array at the second wireless device, a wavelength of the one or more orbital angular momentum signals, a distance between the first wireless device and the second wireless device, or any combination thereof.

16. An apparatus for wireless communication at a second wireless device, comprising:
one or more processors;
one or more memories coupled with the one or more processors; and
instructions stored in the one or more memories and executable by the one or more processors to cause the apparatus to:
receive, from a first wireless device, one or more orbital angular momentum signals in accordance with a set of radial codeword sequences associated with a polynomial radial codeword configuration, the one or more orbital angular momentum signals are associated with a first value of a polynomial term for the polynomial radial codeword configuration;
transmit, to the first wireless device based at least in part on the one or more orbital angular momentum signals, a feedback message indicating a second value of the polynomial term; and
receive, from the first wireless device, one or more additional orbital angular momentum signals in accordance with the set of radial codeword sequences and based at least in part on the second value.

17. The apparatus of claim 16, wherein the instructions are further executable by the one or more processors to cause the apparatus to:
perform measurements on the one or more orbital angular momentum signals; and
determine the second value of the polynomial term based at least in part on the measurements, wherein transmitting the feedback message is based at least in part on determining the second value.

18. The apparatus of claim 16, wherein the instructions are further executable by the one or more processors to cause the apparatus to:
transmit, via the feedback message, a ratio between the first value and the second value of the polynomial term, wherein receiving the one or more additional orbital angular momentum signals is based at least in part on the ratio.

19. The apparatus of claim 16, wherein the instructions are further executable by the one or more processors to cause the apparatus to:
  transmit, via the feedback message, an indication of a subset of radial codeword sequences from the set of radial codeword sequences, wherein the one or more additional orbital angular momentum signals are received in accordance with the subset of radial codeword sequences.

20. The apparatus of claim 16, wherein the instructions are further executable by the one or more processors to cause the apparatus to:
  transmit, via the feedback message, a power allocation associated with at least a subset of the set of radial codeword sequences, wherein the one or more additional orbital angular momentum signals are received based at least in part on the power allocation.

21. The apparatus of claim 16, wherein the instructions are further executable by the one or more processors to cause the apparatus to:
  communicate, with the second wireless device, a message indicating the polynomial radial codeword configuration, wherein receiving the one or more orbital angular momentum signals, transmitting the feedback message, or both, is based at least in part on the message.

22. The apparatus of claim 16, wherein the first value of the polynomial term is based at least in part on a distance.

23. The apparatus of claim 16, wherein the first value, the second value, or both, are based at least in part on a set of parameters associated with a first antenna panel at the first wireless device, a second antenna panel at the second wireless device, or both.

24. The apparatus of claim 23, wherein the set of parameters comprise a first quantity of antenna elements associated with the first antenna panel, a second quantity of antenna elements associated with the second antenna panel, a first radius associated with a first plurality of antenna elements of the first antenna panel, a second radius associated with a second plurality of antenna elements of the second antenna panel, or any combination thereof.

25. The apparatus of claim 16, wherein the instructions are further executable by the one or more processors to cause the apparatus to:
  transmit, to the first wireless device based at least in part on the one or more additional orbital angular momentum signals, a second feedback message indicating a third value of the polynomial term; and
  receive, from the first wireless device, a third set of orbital angular momentum signals in accordance with the set of radial codeword sequences and based at least in part on the third value.

26. The apparatus of claim 16, wherein the instructions are further executable by the one or more processors to cause the apparatus to:
  receive the one or more additional orbital angular momentum signals based at least in part on the second value throughout a time interval based at least in part on a difference between the first value and the second value satisfying a threshold.

27. The apparatus of claim 16, wherein the polynomial radial codeword configuration comprises a Laguerre polynomial configuration or a Slepian polynomial configuration.

28. The apparatus of claim 16, wherein the polynomial term is associated with a beam width value associated with orbital angular momentum signals transmitted by the first wireless device.

29. A method for wireless communication at a first wireless device, comprising:
  transmitting, to a second wireless device, one or more orbital angular momentum signals in accordance with a set of radial codeword sequences associated with a polynomial radial codeword configuration, wherein the one or more orbital angular momentum signals are transmitted based at least in part on a first value of a polynomial term for the polynomial radial codeword configuration;
  receiving, from the second wireless device based at least in part on the one or more orbital angular momentum signals, a feedback message indicating a second value of the polynomial term; and
  transmitting, to the second wireless device, one or more additional orbital angular momentum signals in accordance with the set of radial codeword sequences and based at least in part on the second value.

30. A method for wireless communication at a second wireless device, comprising:
  receiving, from a first wireless device, one or more orbital angular momentum signals in accordance with a set of radial codeword sequences associated with a polynomial radial codeword configuration, the one or more orbital angular momentum signals are associated with a first value of a polynomial term for the polynomial radial codeword configuration;
  transmitting, to the first wireless device based at least in part on the one or more orbital angular momentum signals, a feedback message indicating a second value of the polynomial term; and
  receiving, from the first wireless device, one or more additional orbital angular momentum signals in accordance with the set of radial codeword sequences and based at least in part on the second value.

* * * * *